United States Patent
Dean et al.

(10) Patent No.: US 9,864,489 B2
(45) Date of Patent: *Jan. 9, 2018

(54) COMMAND USER INTERFACE FOR DISPLAYING MULTIPLE SECTIONS OF SOFTWARE FUNCTIONALITY CONTROLS

(71) Applicant: Microsoft Corporation, Redmond, WA (US)

(72) Inventors: Erin Elizabeth Dean, Bellevue, WA (US); Jensen M. Harris, Bellevue, WA (US); Aaron Michael Butcher, Duvall, WA (US); Jesse Clay Satterfield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/635,605

(22) Filed: Mar. 2, 2015

(65) Prior Publication Data
US 2015/0309679 A1   Oct. 29, 2015

Related U.S. Application Data

(63) Continuation of application No. 12/372,386, filed on Feb. 17, 2009, now Pat. No. 9,015,621, which is a
(Continued)

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0481* (2013.01); *G06F 9/4443* (2013.01); *G06F 17/24* (2013.01); *H04N 5/44543* (2013.01)

(58) Field of Classification Search
CPC .... G06F 9/4443; G06F 3/0482; G06F 3/0483; G06F 8/38; G06F 3/04817; G06F 3/04842; G06F 2209/545
See application file for complete search history.

(56) References Cited

U.S. PATENT DOCUMENTS

| 4,815,029 A | 3/1989 | Barker et al. |
| 4,823,283 A | 4/1989 | Diehm et al. ................. 715/825 |

(Continued)

FOREIGN PATENT DOCUMENTS

| AU | 2005203411 | 3/2006 |
| AU | 2007255043 | 8/2012 |

(Continued)

OTHER PUBLICATIONS

U.S. Appl. No. 11/154,278, filed Jun. 16, 2005 entitled "Cross Version and Cross Product User Interface Compatibility".
(Continued)

*Primary Examiner* — Linh K Pham

(57) ABSTRACT

To increase command-access efficiency and to optimize a user's available user interface work space, an improved user interface is provided for displaying logical groupings of selectable software functionality controls that are associated with one or more selected top-level functionalities. Upon selection of a top-level functionality tab, selectable functionalities associated with the top-level functionality tab are divided into logical groupings and are presented in a customizable functionality control section below the tab. Upon selection of a different top-level functionality tab, selectable functionalities associated with the subsequently selected top-level functionality tab may either replace the first functionality control section or may be displayed in a separate
(Continued)

functionality control section adjacent to the first functionality control section if real estate is available in the user interface.

20 Claims, 11 Drawing Sheets

Related U.S. Application Data continuation-in-part of application No. 10/955,967, filed on Sep. 30, 2004, now Pat. No. 8,255,828.

(60) Provisional application No. 60/601,815, filed on Aug. 16, 2004.

(51) Int. Cl.
  *G06F 17/24* (2006.01)
  *G06F 3/0481* (2013.01)
  *G06F 9/44* (2006.01)
  *H04N 5/445* (2011.01)

(56) References Cited

U.S. PATENT DOCUMENTS

| | | | |
|---|---|---|---|
| 5,155,806 A | 10/1992 | Hoeber et al. | 715/711 |
| 5,220,675 A | 6/1993 | Padawer et al. | |
| 5,243,697 A | 9/1993 | Hoeber et al. | |
| 5,247,438 A | 9/1993 | Subas et al. | 700/90 |
| 5,305,435 A | 4/1994 | Bronson | |
| 5,307,086 A | 4/1994 | Griffin et al. | |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,457,476 A | 10/1995 | Jenson | |
| 5,461,708 A | 10/1995 | Kahn | |
| 5,475,805 A | 12/1995 | Murata | |
| 5,500,936 A | 3/1996 | Allen et al. | 395/156 |
| 5,502,805 A | 3/1996 | Anderson et al. | |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |
| 5,659,693 A | 8/1997 | Hansen et al. | 715/779 |
| 5,664,127 A | 9/1997 | Anderson et al. | 715/209 |
| 5,664,208 A | 9/1997 | Pavley et al. | 715/209 |
| 5,673,403 A | 9/1997 | Brown et al. | 715/744 |
| 5,694,610 A | 12/1997 | Habib et al. | |
| 5,721,847 A | 2/1998 | Johnson | 715/786 |
| 5,734,915 A | 3/1998 | Roewer | 395/773 |
| 5,751,373 A | 5/1998 | Ohyama et al. | |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,402 A | 7/1998 | Gipson | 715/201 |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,796,393 A | 8/1998 | MacNaughton et al. | |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,844,588 A | 12/1998 | Anderson | |
| 5,850,561 A | 12/1998 | Church | |
| 5,855,006 A | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | 715/203 |
| 5,874,953 A | 2/1999 | Webster et al. | |
| 5,874,956 A | 2/1999 | LaHood et al. | |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,895,476 A | 4/1999 | Orr et al. | |
| 5,898,436 A | 4/1999 | Stewart et al. | 345/354 |
| 5,899,979 A | 5/1999 | Miller et al. | 705/9 |
| 5,903,902 A | 5/1999 | Orr et al. | |
| 5,905,863 A | 5/1999 | Knowles et al. | 709/206 |
| 5,910,895 A * | 6/1999 | Proskauer | G01R 31/31912 700/121 |
| 5,917,489 A | 6/1999 | Thurlow et al. | |
| 5,924,089 A | 7/1999 | Mocek et al. | |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,956,737 A | 9/1999 | King et al. | |
| 5,960,406 A | 9/1999 | Rasansky et al. | 705/9 |
| 5,963,938 A | 10/1999 | Wilson | |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,043,816 A | 3/2000 | Williams et al. | 345/340 |
| 6,057,836 A | 5/2000 | Kavalam et al. | |
| 6,067,087 A | 5/2000 | Krauss et al. | 715/762 |
| 6,067,551 A | 5/2000 | Brown et al. | |
| 6,072,492 A | 6/2000 | Schagen et al. | 715/733 |
| 6,073,110 A | 6/2000 | Rhodes et al. | 705/7.12 |
| 6,073,142 A | 6/2000 | Geiger et al. | |
| 6,085,206 A | 7/2000 | Domini et al. | 707/533 |
| 6,088,707 A | 7/2000 | Bates et al. | |
| 6,092,103 A | 7/2000 | Pritsch | |
| 6,101,480 A | 8/2000 | Conmy et al. | 705/9 |
| 6,133,915 A | 10/2000 | Arcuri et al. | 715/779 |
| 6,137,488 A | 10/2000 | Kraft | |
| 6,154,755 A | 11/2000 | Dellert et al. | |
| 6,175,363 B1 | 1/2001 | Williams et al. | 345/334 |
| 6,188,401 B1 | 2/2001 | Peyer | |
| 6,188,403 B1 | 2/2001 | Sacerdoti et al. | 715/764 |
| 6,192,381 B1 | 2/2001 | Stiegemeier et al. | 715/210 |
| 6,195,094 B1 | 2/2001 | Celebiler | 715/764 |
| 6,199,102 B1 | 3/2001 | Cobb | |
| 6,211,879 B1 | 4/2001 | Soohoo | 715/854 |
| 6,216,122 B1 | 4/2001 | Elson | 707/5 |
| 6,219,670 B1 | 4/2001 | Mocek et al. | 707/102 |
| 6,222,540 B1 | 4/2001 | Sacerdoti | 345/581 |
| 6,230,173 B1 | 5/2001 | Ferrel et al. | |
| 6,230,309 B1 | 5/2001 | Turner et al. | |
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | 705/8 |
| 6,272,488 B1 | 8/2001 | Chang et al. | |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,311,195 B1 | 10/2001 | Hachiya et al. | |

(56) References Cited

U.S. PATENT DOCUMENTS

| | | | |
|---|---|---|---|
| 6,313,854 B1 | 11/2001 | Gibson | |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,330,589 B1 | 12/2001 | Kennedy | |
| 6,341,277 B1 | 1/2002 | Coden et al. | 707/718 |
| 6,342,901 B1 | 1/2002 | Adler et al. | |
| 6,353,451 B1 | 3/2002 | Teibel et al. | 715/803 |
| 6,356,893 B1 | 3/2002 | Itakura et al. | |
| 6,359,634 B1 | 3/2002 | Cragun et al. | 715/777 |
| 6,369,840 B1 | 4/2002 | Barnett et al. | |
| 6,373,507 B1 | 4/2002 | Camara et al. | 345/825 |
| 6,374,304 B1 | 4/2002 | Chiashi | |
| 6,381,740 B1 | 4/2002 | Miller et al. | |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 * | 8/2002 | Moon | G06F 3/0482 715/777 |
| 6,433,831 B1 | 8/2002 | Dinwiddie et al. | 348/553 |
| 6,434,598 B1 | 8/2002 | Gish | 709/203 |
| 6,442,527 B1 | 8/2002 | Worthington | 705/8 |
| 6,446,118 B1 | 9/2002 | Gottlieb | |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,466,240 B1 | 10/2002 | Maslov | |
| 6,469,722 B1 | 10/2002 | Kineo et al. | 345/837 |
| 6,469,723 B1 | 10/2002 | Gould | |
| 6,476,828 B1 | 11/2002 | Burkett et al. | |
| 6,480,865 B1 | 11/2002 | Lee et al. | 715/523 |
| 6,484,180 B1 | 11/2002 | Lyons et al. | |
| 6,493,006 B1 | 12/2002 | Gourdol et al. | 715/825 |
| 6,493,007 B1 | 12/2002 | Pang | |
| 6,493,731 B1 | 12/2002 | Jones et al. | 715/234 |
| 6,507,845 B1 | 1/2003 | Cohen et al. | 707/608 |
| 6,529,918 B2 | 3/2003 | Takahashi | |
| 6,546,417 B1 | 4/2003 | Baker | 709/206 |
| 6,564,377 B1 | 5/2003 | Jayasimha et al. | |
| 6,567,509 B1 | 5/2003 | Gusler et al. | |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,584,501 B1 | 6/2003 | Cartsonis et al. | |
| 6,603,493 B1 | 8/2003 | Lovell et al. | |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,633,867 B1 | 10/2003 | Kraft et al. | |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/234 |
| 6,701,513 B1 | 3/2004 | Bailey | |
| 6,707,454 B1 | 3/2004 | Barg | |
| 6,707,476 B1 | 3/2004 | Hochstedler | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,778,990 B2 | 8/2004 | Garcia et al. | |
| 6,785,866 B1 | 8/2004 | Lewis et al. | |
| 6,785,868 B1 | 8/2004 | Raff | 715/530 |
| 6,789,107 B1 | 9/2004 | Bates et al. | |
| 6,799,095 B1 | 9/2004 | Owen et al. | |
| 6,816,904 B1 | 11/2004 | Ludwig et al. | |
| 6,825,859 B1 | 11/2004 | Severenuk et al. | 345/764 |
| 6,826,727 B1 | 11/2004 | Mohr et al. | |
| 6,826,729 B1 | 11/2004 | Giesen et al. | 715/837 |
| 6,832,244 B1 | 12/2004 | Raghunandan | |
| 6,847,989 B1 | 1/2005 | Chastain et al. | |
| 6,850,255 B2 | 2/2005 | Muschetto | 715/788 |
| 6,857,103 B1 | 2/2005 | Wason | |
| 6,871,195 B2 | 3/2005 | Ryan et al. | 706/46 |
| 6,882,353 B2 | 4/2005 | Nettles et al. | |
| 6,882,354 B1 | 4/2005 | Nielsen | 715/784 |
| 6,892,193 B2 | 5/2005 | Bolle et al. | |
| 6,892,196 B1 | 5/2005 | Hughes | |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,907,423 B2 | 6/2005 | Weil et al. | |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,610 B2 | 8/2005 | Brintzenhofe et al. | |
| 6,928,613 B1 | 8/2005 | Ishii | |
| 6,931,623 B2 | 8/2005 | Vermeire et al. | |
| 6,934,740 B1 | 8/2005 | Lawande et al. | |
| 6,941,304 B2 | 9/2005 | Gainey et al. | |
| 6,956,429 B1 | 10/2005 | Elbanhawy | |
| 6,964,025 B2 | 11/2005 | Angiulo | 715/838 |
| 6,981,209 B1 | 12/2005 | Parikh et al. | |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | 717/109 |
| 6,993,711 B1 | 1/2006 | Tanaka et al. | |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,039,863 B1 | 5/2006 | Caro et al. | |
| 7,044,363 B2 | 5/2006 | Silverbrook et al. | |
| 7,046,848 B1 | 5/2006 | Olcott | 382/176 |
| 7,051,276 B1 | 5/2006 | Mogilevsky et al. | |
| 7,069,538 B1 | 6/2006 | Renshaw | |
| 7,085,757 B2 | 8/2006 | Dettinger | |
| 7,085,999 B2 | 8/2006 | Maeda et al. | |
| 7,093,162 B2 | 8/2006 | Barga et al. | |
| 7,096,218 B2 | 8/2006 | Schirmer et al. | |
| 7,103,849 B2 | 9/2006 | Aikawa | |
| 7,107,525 B2 | 9/2006 | Purvis | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,113,941 B2 | 9/2006 | Arend | |
| 7,117,370 B2 | 10/2006 | Khan et al. | 713/186 |
| 7,120,868 B2 | 10/2006 | Salesin et al. | |
| 7,134,095 B1 | 11/2006 | Smith et al. | |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,158 B1 | 3/2007 | Stanton et al. | |
| 7,188,317 B1 | 3/2007 | Hazel | 715/804 |
| 7,200,636 B2 | 4/2007 | Harding | |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,219,305 B2 | 5/2007 | Jennings | 715/761 |
| 7,225,244 B2 | 5/2007 | Reynolds et al. | |
| 7,234,132 B2 | 6/2007 | Lam | |
| 7,240,323 B1 | 7/2007 | Desai et al. | 717/100 |
| 7,246,311 B2 | 7/2007 | Bargeron et al. | |
| 7,249,325 B1 | 7/2007 | Donaldson | 715/777 |
| 7,251,640 B2 | 7/2007 | Baumard | |
| 7,263,668 B1 | 8/2007 | Lentz | 715/801 |
| 7,272,789 B2 | 9/2007 | O'Brien | |
| 7,277,572 B2 | 10/2007 | MacInnes et al. | |
| 7,287,233 B2 | 10/2007 | Aren | |
| 7,290,033 B1 | 10/2007 | Goldman et al. | 709/206 |
| 7,296,241 B2 | 11/2007 | Oshiro et al. | |
| 7,318,203 B2 | 1/2008 | Purves et al. | |

(56) References Cited

U.S. PATENT DOCUMENTS

| | | |
|---|---|---|
| 7,325,204 B2 | 1/2008 | Rogers ............... 715/792 |
| 7,328,409 B2 | 2/2008 | Awada et al. ............ 715/765 |
| 7,337,185 B2 | 2/2008 | Ellis et al. ............. 707/102 |
| 7,346,705 B2 | 3/2008 | Hullot et al. ............ 709/238 |
| 7,346,769 B2 | 3/2008 | Forlenza et al. .......... 713/151 |
| 7,356,772 B2 | 4/2008 | Brownholtz et al. ...... 715/752 |
| 7,360,174 B2 | 4/2008 | Grossman et al. ........ 715/854 |
| 7,362,311 B2 | 4/2008 | Filner et al. |
| 7,370,282 B2 | 5/2008 | Cary |
| 7,386,535 B1 | 6/2008 | Kalucha et al. |
| 7,386,835 B1 | 6/2008 | Desai et al. ............ 717/117 |
| 7,392,249 B1 | 6/2008 | Harris et al. ............ 707/5 |
| 7,395,221 B2 | 7/2008 | Doss et al. ............ 705/9 |
| 7,395,500 B2 | 7/2008 | Whittle et al. |
| 7,421,660 B2 | 9/2008 | Charmock et al. ........ 715/751 |
| 7,421,690 B2 | 9/2008 | Forstall et al. .......... 709/206 |
| 7,426,713 B2 | 9/2008 | Duggan et al. .......... 717/100 |
| 7,461,077 B1 | 12/2008 | Greenwood |
| 7,464,343 B2 | 12/2008 | Shaw et al. |
| 7,469,385 B2 | 12/2008 | Harper et al. |
| 7,472,117 B2 | 12/2008 | Dettinger et al. |
| 7,484,213 B2 | 1/2009 | Mathew et al. |
| 7,499,907 B2 | 3/2009 | Brown et al. |
| 7,505,954 B2 | 3/2009 | Heidloff et al. ........... 707/1 |
| 7,530,029 B2 | 5/2009 | Satterfield et al. ......... 715/779 |
| 7,555,707 B1 | 6/2009 | Labarge et al. .......... 715/234 |
| 7,565,403 B2 | 7/2009 | Horvitz et al. |
| 7,567,964 B2 | 7/2009 | Brice et al. ............ 707/9 |
| 7,584,253 B2 | 9/2009 | Curbow et al. .......... 709/206 |
| 7,627,561 B2 | 12/2009 | Pell et al. ............. 707/3 |
| 7,661,075 B2 | 2/2010 | Lahdesmaki |
| 7,664,821 B1 | 2/2010 | Ancin et al. ........... 709/206 |
| 7,681,149 B2 | 3/2010 | Lahdesmaki |
| 7,685,116 B2 | 3/2010 | Pell et al. |
| 7,703,036 B2 | 4/2010 | Satterfield et al. ......... 715/777 |
| 7,707,255 B2 | 4/2010 | Satterfield et al. ......... 709/206 |
| 7,711,742 B2 | 5/2010 | Bennett et al. .......... 707/759 |
| 7,716,593 B2 | 5/2010 | Durazo et al. .......... 715/752 |
| 7,739,259 B2 | 6/2010 | Hartwell et al. ......... 707/706 |
| 7,747,966 B2 | 6/2010 | Leukart et al. .......... 715/792 |
| 7,788,598 B2 | 8/2010 | Bansal et al. .......... 715/810 |
| 7,802,199 B2 | 9/2010 | Shneerson et al. |
| 7,831,902 B2 | 11/2010 | Sourov et al. .......... 715/220 |
| 7,853,877 B2 | 12/2010 | Giesen et al. .......... 715/711 |
| 7,856,596 B2 | 12/2010 | Crider et al. |
| 7,865,868 B2 | 1/2011 | Falzone Schaw et al. |
| 7,870,465 B2 | 1/2011 | VerSteeg ............. 714/774 |
| 7,886,290 B2 | 2/2011 | Dhanjal et al. .......... 717/170 |
| 7,895,531 B2 | 2/2011 | Radtke et al. .......... 715/810 |
| 7,949,963 B1 | 5/2011 | Pham et al. |
| 8,117,542 B2 | 2/2012 | Radtke et al. .......... 715/708 |
| 8,146,016 B2 | 3/2012 | Himberger et al. ........ 715/825 |
| 8,150,930 B2 | 4/2012 | Satterfield et al. ......... 709/206 |
| 8,171,417 B2 | 5/2012 | Bamford et al. |
| 8,201,103 B2 | 6/2012 | Dukhon et al. |
| 8,239,882 B2 | 8/2012 | Dhanjal et al. |
| 8,255,828 B2 | 8/2012 | Harris et al. |
| 8,285,806 B2 | 10/2012 | Yu |
| 8,402,096 B2 | 3/2013 | Affronti et al. |
| 8,479,122 B2 | 7/2013 | Hotelling et al. |
| 8,484,578 B2 | 7/2013 | Gordner et al. |
| 8,605,090 B2 | 12/2013 | Garg et al. |
| 8,627,222 B2 | 1/2014 | Hartwell et al. |
| 8,638,333 B2 | 1/2014 | Garg et al. |
| 8,689,137 B2 | 4/2014 | McCormack et al. |
| 8,762,880 B2 | 6/2014 | Dukhon et al. |
| 8,799,808 B2 | 8/2014 | Satterfield et al. |
| 8,839,139 B2 | 9/2014 | Leukart et al. |
| 9,015,621 B2 | 4/2015 | Dean et al. |
| 9,015,624 B2 | 4/2015 | Radtke et al. |
| 9,046,983 B2 | 6/2015 | Zhao et al. |
| 9,098,473 B2 | 8/2015 | Dukhon et al. |
| 9,098,837 B2 | 8/2015 | Hill et al. |
| 9,182,885 B2 | 11/2015 | Ruscher et al. |
| 9,223,477 B2 | 12/2015 | Harris et al. |
| 9,304,658 B2 | 4/2016 | Mercer |
| 2001/0014900 A1 | 8/2001 | Brauer et al. |
| 2001/0032220 A1 | 10/2001 | Ven Hoff ............. 707/513 |
| 2001/0034762 A1 | 10/2001 | Jacobs et al. |
| 2001/0035882 A1 | 11/2001 | Stoakley et al. ........... 715/779 |
| 2001/0038395 A1 | 11/2001 | Holtzblatt et al. |
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. ............ 707/3 |
| 2002/0004734 A1 | 1/2002 | Nishizawa |
| 2002/0007380 A1 | 1/2002 | Bauchot et al. .......... 707/530 |
| 2002/0024638 A1 | 2/2002 | Hidari et al. |
| 2002/0029247 A1 | 3/2002 | Kawamoto ............. 709/206 |
| 2002/0036662 A1 | 3/2002 | Gauthier et al. |
| 2002/0037754 A1 | 3/2002 | Hama et al. ............ 455/566 |
| 2002/0052721 A1 | 5/2002 | Ruff et al. ............ 703/1 |
| 2002/0052880 A1 | 5/2002 | Fruensgaard et al. ..... 707/104.1 |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. .......... 345/810 |
| 2002/0073091 A1 | 6/2002 | Jain et al. |
| 2002/0073156 A1 | 6/2002 | Newman |
| 2002/0075330 A1 | 6/2002 | Rosenzweig et al. ........ 345/854 |
| 2002/0078143 A1 | 6/2002 | DeBoor et al. .......... 709/203 |
| 2002/0083054 A1 | 6/2002 | Peltonen et al. .......... 707/5 |
| 2002/0083097 A1 | 6/2002 | Warrington |
| 2002/0089543 A1 | 7/2002 | Ostergaard et al. |
| 2002/0091697 A1 | 7/2002 | Huang et al. ........... 707/10 |
| 2002/0091739 A1 | 7/2002 | Ferlitsch ............. 707/526 |
| 2002/0097266 A1 | 7/2002 | Hachiya et al. |
| 2002/0099775 A1 | 7/2002 | Gupta et al. |
| 2002/0116508 A1 | 8/2002 | Khan et al. |
| 2002/0122071 A1 | 9/2002 | Camara et al. .......... 715/810 |
| 2002/0123984 A1 | 9/2002 | Prakash |
| 2002/0123991 A1 | 9/2002 | Asami |
| 2002/0129052 A1 | 9/2002 | Glazer et al. |
| 2002/0133557 A1 | 9/2002 | Winarski ............. 709/207 |
| 2002/0135621 A1 | 9/2002 | Angiulo et al. .......... 345/838 |
| 2002/0140731 A1 | 10/2002 | Subramaniam et al. ..... 345/762 |
| 2002/0140740 A1 | 10/2002 | Chen ............... 715/810 |
| 2002/0149623 A1 | 10/2002 | West et al. ........... 345/765 |
| 2002/0149629 A1 | 10/2002 | Craycroft et al. ......... 345/861 |
| 2002/0154178 A1 | 10/2002 | Barnett et al. .......... 715/853 |
| 2002/0156815 A1 | 10/2002 | Davia |
| 2002/0158876 A1 | 10/2002 | Janssen ............. 345/504 |
| 2002/0163538 A1 | 11/2002 | Shteyn ............. 345/752 |
| 2002/0175938 A1 | 11/2002 | Hackworth ........... 345/751 |
| 2002/0175955 A1 | 11/2002 | Gourdol et al. .......... 345/821 |
| 2002/0186257 A1 | 12/2002 | Cadiz et al. .......... 715/764 |
| 2002/0188515 A1 | 12/2002 | Nakata et al. |
| 2002/0188632 A1 | 12/2002 | Su |
| 2002/0196293 A1 | 12/2002 | Suppan et al. .......... 345/853 |
| 2003/0005051 A1 | 1/2003 | Gottlieb |
| 2003/0005056 A1 | 1/2003 | Yamamoto et al. |
| 2003/0009455 A1 | 1/2003 | Carlson et al. .......... 707/6 |
| 2003/0011564 A1 | 1/2003 | Ushino et al. |
| 2003/0011638 A1 | 1/2003 | Chung ............. 345/808 |
| 2003/0011639 A1 | 1/2003 | Webb ............. 715/808 |
| 2003/0014421 A1 | 1/2003 | Jung ............. 707/102 |
| 2003/0014490 A1 | 1/2003 | Bates et al. .......... 709/206 |
| 2003/0016248 A1 | 1/2003 | Hayes Ubillos |
| 2003/0022700 A1 | 1/2003 | Wang ............. 455/566 |
| 2003/0025732 A1 | 2/2003 | Prichard ........... 345/765 |
| 2003/0025737 A1 | 2/2003 | Breinberg |
| 2003/0028560 A1 | 2/2003 | Kudrolli et al. |
| 2003/0035012 A1 | 2/2003 | Kurtenbach et al. |
| 2003/0035917 A1 | 2/2003 | Hyman ............. 428/67 |
| 2003/0038832 A1 | 2/2003 | Sobol ............. 715/722 |
| 2003/0043200 A1 | 3/2003 | Faieta et al. ........... 345/804 |
| 2003/0043211 A1 | 3/2003 | Kremer et al. .......... 715/838 |
| 2003/0046528 A1 | 3/2003 | Haitani et al. ........... 713/2 |
| 2003/0050986 A1 | 3/2003 | Matthews et al. |
| 2003/0064707 A1 | 4/2003 | Voneyama |
| 2003/0066025 A1 | 4/2003 | Garner et al. .......... 715/500 |
| 2003/0069892 A1 | 4/2003 | Hind et al. |
| 2003/0069900 A1 | 4/2003 | Hind et al. |

(56) References Cited

U.S. PATENT DOCUMENTS

| | | | |
|---|---|---|---|
| 2003/0070143 A1 | 4/2003 | Maslov | 715/513 |
| 2003/0084035 A1 | 5/2003 | Emerick, III | 707/3 |
| 2003/0093490 A1 | 5/2003 | Yamamoto et al. | 709/213 |
| 2003/0097361 A1 | 5/2003 | Huang et al. | 707/10 |
| 2003/0097640 A1 | 5/2003 | Abrams et al. | 715/530 |
| 2003/0098891 A1 | 5/2003 | Molander | 715/841 |
| 2003/0106024 A1 | 6/2003 | Silverbrook et al. | 715/515 |
| 2003/0110191 A1 | 6/2003 | Handsaker et al. | 707/503 |
| 2003/0112278 A1 | 6/2003 | Driskell | 715/788 |
| 2003/0128243 A1 | 7/2003 | Okamoto | |
| 2003/0132972 A1 | 7/2003 | Pang | |
| 2003/0135825 A1 | 7/2003 | Gertner et al. | 715/513 |
| 2003/0154254 A1 | 8/2003 | Awasthi | |
| 2003/0156140 A1 | 8/2003 | Watanabe | 345/810 |
| 2003/0160821 A1 | 8/2003 | Yoon | 345/762 |
| 2003/0163455 A1 | 8/2003 | Dettinger et al. | 707/3 |
| 2003/0163537 A1 | 8/2003 | Rohall et al. | 709/206 |
| 2003/0167310 A1 | 9/2003 | Moody et al. | 709/206 |
| 2003/0167315 A1 | 9/2003 | Chowdhry et al. | |
| 2003/0169284 A1 | 9/2003 | Dettinger et al. | 715/708 |
| 2003/0177190 A1 | 9/2003 | Moody et al. | |
| 2003/0184585 A1 | 10/2003 | Lin et al. | |
| 2003/0187586 A1 | 10/2003 | Katzenmaier et al. | |
| 2003/0195937 A1 | 10/2003 | Kircher et al. | 709/207 |
| 2003/0200267 A1 | 10/2003 | Garrigues | |
| 2003/0206646 A1 | 11/2003 | Brackett | 382/128 |
| 2003/0218611 A1 | 11/2003 | Ben-Tovim et al. | 345/440 |
| 2003/0220138 A1 | 11/2003 | Walker et al. | |
| 2003/0225823 A1 | 12/2003 | Meeuwissen et al. | |
| 2003/0226106 A1 | 12/2003 | McKellar et al. | 715/513 |
| 2003/0227487 A1 | 12/2003 | Hugh | 715/777 |
| 2003/0229668 A1 | 12/2003 | Malik | |
| 2003/0229673 A1 | 12/2003 | Malik | |
| 2003/0233419 A1 | 12/2003 | Beringer | 709/206 |
| 2004/0002941 A1 | 1/2004 | Thorne et al. | |
| 2004/0003351 A1 | 1/2004 | Sommerer et al. | 715/251 |
| 2004/0006570 A1 | 1/2004 | Gelb et al. | 707/102 |
| 2004/0010513 A1 | 1/2004 | Scherr et al. | |
| 2004/0012633 A1 | 1/2004 | Helt | 715/764 |
| 2004/0021647 A1 | 2/2004 | Iwema et al. | |
| 2004/0024824 A1 | 2/2004 | Ferguson et al. | |
| 2004/0030993 A1 | 2/2004 | Hong Huey et al. | |
| 2004/0056894 A1 | 3/2004 | Zaika et al. | 345/762 |
| 2004/0061713 A1 | 4/2004 | Jennings | |
| 2004/0068695 A1 | 4/2004 | Daniell et al. | |
| 2004/0073503 A1 | 4/2004 | Morales et al. | |
| 2004/0083432 A1 | 4/2004 | Kawamura et al. | 715/526 |
| 2004/0088359 A1 | 5/2004 | Simpson | |
| 2004/0090315 A1 | 5/2004 | Mackjust et al. | 340/426.13 |
| 2004/0093290 A1 | 5/2004 | Doss et al. | |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 345/764 |
| 2004/0109033 A1 | 6/2004 | Vienneau et al. | 345/863 |
| 2004/0117451 A1 | 6/2004 | Chung | 709/207 |
| 2004/0119755 A1 | 6/2004 | Guibourge | |
| 2004/0119760 A1 | 6/2004 | Grossman et al. | 715/854 |
| 2004/0122789 A1 | 6/2004 | Ostertag et al. | |
| 2004/0125142 A1 | 7/2004 | Mock et al. | 345/765 |
| 2004/0128275 A1 | 7/2004 | Moehrle | 707/1 |
| 2004/0133854 A1 | 7/2004 | Black | 715/517 |
| 2004/0135811 A1 | 7/2004 | Pickering et al. | |
| 2004/0139435 A1 | 7/2004 | Cui et al. | |
| 2004/0142720 A1 | 7/2004 | Smethers | 455/550.1 |
| 2004/0153968 A1 | 8/2004 | Ching et al. | 715/513 |
| 2004/0153973 A1 | 8/2004 | Horowitz | |
| 2004/0164983 A1 | 8/2004 | Khozai | 345/440 |
| 2004/0168153 A1 | 8/2004 | Marvin | 717/120 |
| 2004/0186775 A1 | 9/2004 | Margiloff et al. | 705/14 |
| 2004/0189694 A1 | 9/2004 | Kurtz et al. | |
| 2004/0192440 A1 | 9/2004 | Evans et al. | |
| 2004/0196309 A1 | 10/2004 | Hawkins | |
| 2004/0205536 A1 | 10/2004 | Newman et al. | |
| 2004/0212640 A1 | 10/2004 | Mann | |
| 2004/0215612 A1 | 10/2004 | Brody | 707/3 |
| 2004/0221234 A1 | 11/2004 | Imai | 715/256 |
| 2004/0221309 A1 | 11/2004 | Zaner et al. | |
| 2004/0230508 A1 | 11/2004 | Minnis et al. | 705/35 |
| 2004/0230906 A1 | 11/2004 | Pik et al. | 715/522 |
| 2004/0233239 A1 | 11/2004 | Landesmaki | |
| 2004/0236796 A1 | 11/2004 | Bhatt et al. | |
| 2004/0239700 A1 | 12/2004 | Baschy | 715/781 |
| 2004/0243938 A1 | 12/2004 | Weise et al. | 715/205 |
| 2004/0254928 A1 | 12/2004 | Vronay | |
| 2004/0260756 A1 | 12/2004 | Forstall et al. | |
| 2004/0261013 A1 | 12/2004 | Wynn et al. | 715/511 |
| 2004/0268231 A1 | 12/2004 | Tunning | 715/513 |
| 2004/0268235 A1 | 12/2004 | Wason | |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | 709/206 |
| 2005/0005235 A1 | 1/2005 | Satterfield et al. | 715/519 |
| 2005/0005249 A1 | 1/2005 | Hill et al. | 715/963 |
| 2005/0010871 A1 | 1/2005 | Ruthfield et al. | 715/712 |
| 2005/0015361 A1 | 1/2005 | Payton et al. | |
| 2005/0015364 A1 | 1/2005 | Payton | |
| 2005/0021504 A1 | 1/2005 | Atchison | 707/3 |
| 2005/0021521 A1 | 1/2005 | Wycoff | |
| 2005/0022116 A1 | 1/2005 | Bowman et al. | 715/513 |
| 2005/0033614 A1 | 2/2005 | Lettovsky et al. | 705/5 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0055449 A1 | 3/2005 | Rappold, III | 709/228 |
| 2005/0057584 A1 | 3/2005 | Gruen et al. | 715/752 |
| 2005/0060337 A1 | 3/2005 | Chou et al. | |
| 2005/0071242 A1 | 3/2005 | Allen et al. | |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0097511 A1 | 5/2005 | Bergman et al. | |
| 2005/0108348 A1 | 5/2005 | Lee | |
| 2005/0108734 A1 | 5/2005 | Need et al. | |
| 2005/0114778 A1 | 5/2005 | Branson et al. | 715/711 |
| 2005/0117179 A1 | 6/2005 | Ito et al. | 358/1.15 |
| 2005/0132010 A1 | 6/2005 | Muller | |
| 2005/0132053 A1 | 6/2005 | Roth et al. | 709/227 |
| 2005/0137873 A1 | 6/2005 | Liu | |
| 2005/0138576 A1 | 6/2005 | Baumert et al. | 715/862 |
| 2005/0144241 A1 | 6/2005 | Stata et al. | |
| 2005/0144284 A1 | 6/2005 | Ludwig et al. | 709/226 |
| 2005/0144560 A1 | 6/2005 | Gruen et al. | |
| 2005/0144568 A1 | 6/2005 | Gruen et al. | 715/822 |
| 2005/0172262 A1 | 8/2005 | Lalwani | 717/109 |
| 2005/0177789 A1 | 8/2005 | Abbar et al. | 705/528 |
| 2005/0183008 A1 | 8/2005 | Crider et al. | 715/517 |
| 2005/0185920 A1 | 8/2005 | Harper et al. | |
| 2005/0198573 A1 | 9/2005 | Ali et al. | |
| 2005/0203975 A1 | 9/2005 | Jindal et al. | 707/204 |
| 2005/0216863 A1 | 9/2005 | Schumacher et al. | 715/827 |
| 2005/0222985 A1 | 10/2005 | Buchheit et al. | |
| 2005/0223057 A1 | 10/2005 | Buchheit et al. | |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0240902 A1 | 10/2005 | Bunker et al. | 717/114 |
| 2005/0251757 A1 | 11/2005 | Farn | |
| 2005/0256867 A1 | 11/2005 | Walther et al. | 707/5 |
| 2005/0278656 A1 | 12/2005 | Goldthwaite et al. | 715/810 |
| 2005/0289109 A1 | 12/2005 | Arrouye et al. | 707/1 |
| 2005/0289156 A1 | 12/2005 | Maryka et al. | 707/100 |
| 2005/0289158 A1 | 12/2005 | Weiss et al. | 707/100 |
| 2005/0289159 A1 | 12/2005 | Hadley et al. | |
| 2006/0015816 A1 | 1/2006 | Kuehner et al. | 715/744 |
| 2006/0020962 A1 | 1/2006 | Stark et al. | 725/32 |
| 2006/0026033 A1 | 2/2006 | Brydon et al. | 705/1 |
| 2006/0026145 A1 | 2/2006 | Beringer et al. | |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1 | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |

(56) References Cited

U.S. PATENT DOCUMENTS

| | | | |
|---|---|---|---|
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0053383 A1 | 3/2006 | Gauthier et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0074844 A1 | 4/2006 | Frankel et al. | |
| 2006/0080303 A1 | 4/2006 | Sargent et al. | 707/3 |
| 2006/0085502 A1 | 4/2006 | Sundararajan et al. | |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0117302 A1 | 6/2006 | Mercer et al. | 717/131 |
| 2006/0129937 A1 | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0165105 A1 | 7/2006 | Shenfield et al. | |
| 2006/0168522 A1 | 7/2006 | Bala | |
| 2006/0173824 A1 | 8/2006 | Bensky | 707/3 |
| 2006/0173961 A1 | 8/2006 | Turski et al. | |
| 2006/0200455 A1 | 9/2006 | Wilson | |
| 2006/0218500 A1 | 9/2006 | Sauve et al. | 715/767 |
| 2006/0224946 A1 | 10/2006 | Barrett et al. | |
| 2006/0242557 A1 | 10/2006 | Nortis, III | 715/234 |
| 2006/0242575 A1 | 10/2006 | Winser | 715/530 |
| 2006/0242591 A1 | 10/2006 | Van Dok | |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | 715/236 |
| 2006/0294526 A1 | 12/2006 | Hambrick et al. | 719/315 |
| 2007/0006075 A1 | 1/2007 | Lection et al. | |
| 2007/0006206 A1 | 1/2007 | Dhanjal et al. | 717/168 |
| 2007/0011258 A1 | 1/2007 | Koo | |
| 2007/0016857 A1 | 1/2007 | Polleck et al. | |
| 2007/0033250 A1 | 2/2007 | Levin et al. | 709/204 |
| 2007/0034762 A1 | 2/2007 | White | |
| 2007/0050182 A1 | 3/2007 | Sneddon et al. | 704/2 |
| 2007/0050401 A1 | 3/2007 | Young et al. | 707/102 |
| 2007/0050469 A1 | 3/2007 | Gupta et al. | |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061705 A1 | 3/2007 | Ammerlaan | |
| 2007/0061738 A1 | 3/2007 | Taboada et al. | |
| 2007/0094230 A1 | 4/2007 | Subramaniam et al. | |
| 2007/0094608 A1 | 4/2007 | Getsch | |
| 2007/0101299 A1 | 5/2007 | Shaw et al. | |
| 2007/0106951 A1 | 5/2007 | McCormack et al. | 715/764 |
| 2007/0124696 A1 | 5/2007 | Mullender | |
| 2007/0130276 A1 | 6/2007 | Zhang et al. | |
| 2007/0143662 A1 | 6/2007 | Carlson et al. | 715/507 |
| 2007/0143671 A1 | 6/2007 | Paterson et al. | 715/209 |
| 2007/0180040 A1 | 8/2007 | Etgen et al. | 709/207 |
| 2007/0185826 A1 | 8/2007 | Brice et al. | 707/1 |
| 2007/0203991 A1 | 8/2007 | Fisher et al. | |
| 2007/0209008 A1 | 9/2007 | Mori et al. | |
| 2007/0234223 A1 | 10/2007 | Leavitt et al. | |
| 2007/0240057 A1 | 10/2007 | Satterfield et al. | 715/705 |
| 2007/0260996 A1 | 11/2007 | Jakobson | 715/781 |
| 2007/0266017 A1 | 11/2007 | Held et al. | |
| 2007/0279417 A1 | 12/2007 | Garg et al. | 345/440 |
| 2007/0282956 A1 | 12/2007 | Staats | 709/206 |
| 2007/0300168 A1 | 12/2007 | Bosma et al. | 715/820 |
| 2008/0005247 A9 | 1/2008 | Khoo | |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0046518 A1 | 2/2008 | Tonnison et al. | |
| 2008/0052670 A1 | 2/2008 | Espinosa et al. | |
| 2008/0077571 A1 | 3/2008 | Harris et al. | 707/5 |
| 2008/0098229 A1 | 4/2008 | Hartrell et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141156 A1 | 6/2008 | Reik | |
| 2008/0141242 A1 | 6/2008 | Shapiro | 717/174 |
| 2008/0155555 A1 | 6/2008 | Kwong | 719/315 |
| 2008/0168146 A1 | 7/2008 | Fletcher | |
| 2008/0178110 A1 | 7/2008 | Hill et al. | 715/771 |
| 2008/0209316 A1 | 8/2008 | Zandstra | |
| 2008/0216014 A1 | 9/2008 | Kurtenbach et al. | |
| 2008/0244440 A1 | 10/2008 | Bailey | |
| 2009/0007003 A1 | 1/2009 | Dukhon et al. | 715/778 |
| 2009/0012984 A1 | 1/2009 | Ravid et al. | 707/101 |
| 2009/0034618 A1 | 2/2009 | Fu et al. | |
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | 709/206 |
| 2009/0144651 A1 | 6/2009 | Sprang et al. | |
| 2009/0152349 A1 | 6/2009 | Bonev et al. | |
| 2009/0158173 A1 | 6/2009 | Palahnuk et al. | |
| 2009/0192845 A1 | 7/2009 | Gudipaty et al. | |
| 2009/0217192 A1 | 8/2009 | Dean et al. | 715/777 |
| 2009/0222763 A1 | 9/2009 | Dukhon et al. | 715/808 |
| 2009/0249339 A1 | 10/2009 | Larsson et al. | |
| 2009/0319619 A1 | 12/2009 | Affronti | |
| 2009/0319911 A1 | 12/2009 | McCann | |
| 2010/0011310 A1 | 1/2010 | Rainisto | 715/769 |
| 2010/0011319 A1 | 1/2010 | Gourdol et al. | |
| 2010/0060645 A1 | 3/2010 | Garg et al. | 345/440 |
| 2010/0159967 A1 | 6/2010 | Pounds et al. | |
| 2010/0180226 A1 | 7/2010 | Satterfield et al. | 715/777 |
| 2010/0191818 A1 | 7/2010 | Satterfield et al. | 709/206 |
| 2010/0199261 A1 | 8/2010 | Shenfield et al. | |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0041092 A1 | 2/2011 | Zhang | |
| 2011/0055673 A1 | 3/2011 | Teng et al. | |
| 2011/0055690 A1 | 3/2011 | Wason | |
| 2011/0072396 A1 | 3/2011 | Giesen et al. | 715/841 |
| 2011/0138273 A1 | 6/2011 | Radtke et al. | 715/256 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |
| 2013/0283207 A1 | 10/2013 | Dukhon et al. | |
| 2013/0305141 A1 | 11/2013 | Wason | |
| 2014/0019896 A1 | 1/2014 | Satterfield et al. | |
| 2014/0115526 A1 | 4/2014 | Hartwell et al. | |
| 2014/0132609 A1 | 5/2014 | Garg et al. | |
| 2014/0258933 A1 | 9/2014 | Dukhon et al. | |
| 2015/0220276 A1 | 8/2015 | Zhao et al. | |
| 2015/0339281 A1 | 11/2015 | Dukhon et al. | |
| 2015/0370771 A1 | 12/2015 | Dukhon et al. | |
| 2016/0117069 A1 | 4/2016 | Harris et al. | |
| 2017/0262810 A1 | 9/2017 | McCann et al. | |

FOREIGN PATENT DOCUMENTS

| | | |
|---|---|---|
| AU | 2010216342 | 7/2014 |
| BR | PI0503986 | 3/2006 |
| BR | PI0503986 | 3/2006 |
| CA | 2650016 | 9/2014 |
| CA | 2512036 | 11/2015 |
| CN | 0 584 269 B1 | 3/1994 |
| CN | 1553377 | 12/2004 |
| CN | 1746914 | 3/2006 |
| CN | 1755599 A | 4/2006 |
| CN | 101243439 B | 6/2012 |

(56) References Cited

FOREIGN PATENT DOCUMENTS

| | | |
|---|---|---|
| CN | 102067166 B | 6/2013 |
| CN | 102317897 B | 7/2013 |
| CN | 102077163 B | 10/2013 |
| CN | 102077199 B | 1/2014 |
| EP | 587394 | 3/1994 |
| EP | 0774722 A2 | 5/1997 |
| EP | 0851368 A2 | 7/1998 |
| EP | 0 910 007 | 4/1999 |
| EP | 1 077 405 A2 | 2/2001 |
| EP | 1 104 151 | 5/2001 |
| EP | 1 223 503 | 7/2002 |
| EP | 1 376 337 | 2/2004 |
| EP | 1394713 | 3/2004 |
| EP | 1 462 999 A2 | 9/2004 |
| EP | 1 542 133 A2 | 6/2005 |
| EP | 1 564 652 | 8/2005 |
| EP | 1 628 197 | 2/2006 |
| EP | 1 628 198 | 2/2006 |
| EP | 1 628 199 | 2/2006 |
| EP | 1 645 972 | 4/2006 |
| EP | 1 672 518 | 6/2006 |
| EP | 1 835 434 A1 | 9/2007 |
| EP | 1 915 001 | 4/2008 |
| GB | 2 329 813 | 3/1999 |
| GB | 2 391 148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | 06-342357 | 12/1994 |
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2001-034775 | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2003-316630 A | 11/2003 |
| JP | 2004-078512 | 3/2004 | ............. G06F 17/30 |
| JP | 2004-086893 | 3/2004 |
| JP | 2004-102803 | 4/2004 | ............. G06F 17/30 |
| JP | 2004-512578 | 4/2004 |
| JP | 2004-145569 | 5/2004 | ............. G06F 17/21 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005-182353 | 7/2005 | ............. G06F 17/30 |
| JP | 2005-236089 | 9/2005 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2008-117019 A | 5/2008 |
| JP | 2009-507311 | 2/2009 |
| JP | 4832024 | 9/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5480894 | 2/2014 |
| JP | 5486595 | 2/2014 |
| JP | 5559817 | 6/2014 |
| JP | 5559845 | 6/2014 |
| JP | 5597698 | 8/2014 |
| KR | 1020020066643 | 8/2002 |
| KR | 10-2003-0070685 | 2/2003 |
| KR | 10-0450881 B1 | 9/2004 |
| KR | 10-2005-0023805 A | 3/2005 |
| KR | 10-2005-0036702 A | 4/2005 |
| KR | 10-2005-0072073 A | 7/2005 |
| KR | 10-2006-0046735 A | 5/2006 |
| KR | 10-2007-0000506 | 1/2007 |
| KR | 10/2008-000281 A | 1/2008 |
| KR | 10-2008-0002811 A | 1/2008 |
| KR | 10-2008-0041234 A | 5/2008 |
| KR | 10-2008-0042852 A | 5/2008 |
| KR | 10-1130421 | 3/2012 |
| KR | 101129221 B1 | 3/2012 |
| KR | 10-1149960 | 5/2012 |
| KR | 10-1149990 | 5/2012 |
| KR | 10-1159334 | 6/2012 |
| KR | 101161564 B1 | 7/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MX | 315932 | 12/2013 |
| MX | 322458 | 4/2014 |
| MX | 323275 | 9/2014 |
| MX | 323276 | 9/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |
| RU | 2001-122576 A | 9/2003 |
| RU | 2004-108142 | 8/2005 |
| RU | 2005-116667 | 11/2006 |
| RU | 2005/120362 | 1/2007 |
| RU | 2005-130357 | 4/2007 |
| RU | 2322687 | 4/2008 |
| RU | 2327205 C2 | 6/2008 |
| RU | 2328034 | 6/2008 |
| RU | 2332728 C2 | 8/2008 |
| RU | 2537776 C2 | 1/2015 |
| TW | 420953 | 2/2001 |
| TW | 460839 | 10/2001 |
| TW | 490652 | 6/2002 |
| TW | 527812 | 4/2003 |
| TW | 2003-05097 | 10/2003 |
| TW | 569122 | 1/2004 |
| TW | 200514018 A | 4/2005 |
| TW | I254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| TW | I512591 | 12/2015 |
| WO | WO 92/21091 | 11/1992 |
| WO | WO 94/20921 | 9/1994 |
| WO | WO 96/10231 | 4/1996 |
| WO | WO 96/39654 | 12/1996 |
| WO | WO 98/20410 | 5/1998 |
| WO | 99/04353 | 1/1999 |
| WO | WO 99/04353 A1 | 1/1999 | ............. G06F 17/60 |
| WO | WO 99/27495 | 6/1999 |
| WO | WO 01/55894 | 8/2001 |

(56) References Cited

FOREIGN PATENT DOCUMENTS

| WO | WO 02/091162 A3 | 11/2002 |
|---|---|---|
| WO | WO 03/003240 A2 | 1/2003 |
| WO | WO 03/098500 | 11/2003 |
| WO | 2004/027672 A9 | 4/2004 |
| WO | WO 2007/030696 | 3/2007 |
| WO | WO 2007/030727 A3 | 3/2007 |
| WO | WO 2007/033159 A1 | 3/2007 |
| WO | WO 2007/036762 A1 | 4/2007 |
| WO | WO 2007/027737 A1 | 8/2007 |
| WO | WO 2008/027477 | 3/2008 |
| WO | WO 2008/121718 A1 | 10/2008 |
| WO | WO 2009/123801 | 10/2009 |
| WO | WO 2009/158151 | 12/2009 |
| WO | WO 2009/158171 | 12/2009 |
| WO | WO 2009/158172 | 12/2009 |
| ZA | 2010/07809 | 2/2012 |
| ZA | 2010/07810 | 2/2012 |
| ZA | 2010/07875 | 2/2012 |
| ZA | 2011/04850 | 12/2012 |
| ZA | 201080021957.4 | 11/2014 |

OTHER PUBLICATIONS

U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
U.S. Appl. No. 12/372,386, filed Feb. 17, 2009 entitled "Command User Interface for Displaying Multiple Sections of Software Functionality Controls".
U.S. Appl. No. 12/163,758, filed Jun. 27, 2008 entitled "Communication Between a Document Editor-in-Space User Interface and a Document Editor Out-Space User Interface".
U.S. Appl. No. 12/163,784, filed Jun. 27, 2008 entitled "Exposing Non-Authoring Features Through Document Status Information in an Out-Space User Interface".
U.S. Appl. No. 11/445,393, filed Jun. 1, 2006 entitled "Modifying a Chart".
U.S. Appl. No. 12/028,797, filed Feb. 11, 2008 entitled "Side-by-Side Shared Calendars".
U.S. Appl. No. 11/430,561, filed May 9, 2006 entitled "Integrated Search and Find User Interface".
U.S. Appl. No. 11/430,562, filed May 9, 2006 entitled "Expanded Search and Find User Interface".
U.S. Appl. No. 11/430,416, filed May 9, 2006 entitled "Search and Find Using Expanded Search Scope".
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
U.S. Appl. No. 12/954,952, filed Nov. 29, 2010 entitled "Gallery User Interface Controls".
U.S. Appl. No. 13/027,289, filed Feb. 15, 2011 entitled "Floating Command Object".
U.S. Appl. No. 13/102,633, filed May 6, 2011 entitled "Markup Based Extensibility for User Interfaces".
U.S. Appl. No. 13/427,939, filed Mar. 23, 2012 entitled "An Improved User Interface for Displaying a Gallery of Formatting Options Applicable to a Selected Object".
U.S. Appl. No. 13/437,031, filed Apr. 2, 2012 entitled "Automatic Grouping of Electronic Mail".
U.S. Appl. No. 13/464,572, filed May 4, 2012 entitled "Accessing an Out-Space User Interface for a Document Editor Program".
U.S. Appl. No. 14/635,605, filed Mar. 2, 2015 entitled "Command User Interface for Displaying Selectable Software Functionality Controls".
U.S. Appl. No. 12/059,644, filed Mar. 31, 2008 entitled "Associating Command Surfaces with Multiple Active Components".
U.S. Appl. No. 09/620,876, filed Jul. 21, 2000 entitled "On-Objuect User Interface".
U.S. Appl. No. 10/780,547, filed Feb. 17, 2004 entitled "Method and System for Seperation of Content and Layout Definitions in a Display Description" (Perkins Case).
Charles Rich et al "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al "The Hotbox: Efficient Access to a Large Number of Menu-items," ACM, 1999, pp. 231-237, May 1999.
Charles Rich et al "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al "Microsoft Office XP Inside Out," 2001, pp. 1005-1009, 1015, 1023-1028, 1036-1039, 1093.
Riggsby et al "Mastering Lotus Notes and Domino 6," 2003, pp. 135-139.
Riggsby et al "Mastering Lotus Notes and Domino 6," 2003, pp. 135-138, 607-612.
Khare et al "The Origin of (Document) Species," University of California, 1998, 9 pgs.
"Separate Structure and Presentation," http://www.webreference.com/html/tutorial5/1.html, Aug. 20, 1998, 4 pgs.
Stephanos Piperoglou, "The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.

(56) References Cited

OTHER PUBLICATIONS

"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
Stephanos Piperoglou, "External Style Sheets," http://www.webreference.com/html/tutorial5/9.html, Aug. 20, 1998, 3 pgs.
Raman, "Cascaded Speech Style Sheets," 1997, 7 pgs.
"Primary Windows," Accessed at http://www-03.ibm.com/servers/eserver/iseries/navigator/guidelines/primary.html on Feb. 23, 2007, 23 pgs.
Schumaker, "User Interface Standards," http://msdn2.microsoft.com/en-us/library/aa217660(office.11.d=printer).aspx, Sep. 2001, 5 pgs.
Budinsky et al "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al "Virtual Folders: Database Support for Electronic Messages Classification," Pontificia Universidade Catolica do Rio Grande do Sul, Porto Alegre, Brazil, pp. 163-170.
Goldberg et al "Using Collaborative Filtering to Weave an Information Tapestry," Communication of the ACM, vol. 35, No. 12, pp. 61-70, Dec. 1992.
Liu et al "Continual Queries for Internet Scale Event-Driven Information Delivery," IEEE Transactions on Knowledge and Data Engineering, vol. 11, Issue 1, pp. 610-628, 1999.
Chen et al "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manualhtml and http://web.archive.org/web/20040812092939/http://www.ipi.fi/~rainy/index.php?pn=probjects&project=rainlendar>.
Microsoft Windows XP Professional Version 2002, Service pack 2, 3 pgs.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html 2 pages.
Hepfner, Troy, "New SOCET CXP Interface Improves Usability," Sep. 2008, http://www.socetset.com/gxpmosaic/?p=95, 4 pages.
"Creating Charts: An Introduction," Excel for Chemists: . A Comprehensive Guide, E. Joseph Billo. http://www.ahut.edu.cn/yxsz/ahk/Teaching/Excel%for%20Chemists/ChQ2.pdf.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
"TeeChart for .NET Charting Control," Steema Software; accessed at: http://www.teechart.net/; accessed on Jan. 11, 2006.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages. (Feb. 13, 2007).
"The Technology in Document and Check Security," http://www.securedoc.in/thetechnology.htm, 7 pages (Date Printed Apr. 21, 2008).

(56) References Cited

OTHER PUBLICATIONS

Ando, R. et al "Visualization-enabled multi-document summarization by Iterative Residual Resealing," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1 .html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al "Microsoft Office XP Inside Out," 2001, pp. 4, 5, 10, 11, 70-74, 281-288, 1010-1014.
Pogue, David. "Windows XP Home Edition: The Missing Manual" O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al "Microsoft Office 2003", Feb. 24, 2004, p. 39-40, 120-124, 175-177, 233-234 [D1].
Berliner E.M. et al "Microsoft Office 2003", Feb. 24, 2004, p. 173-178 [D2].
Perronne et al "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunalkundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Halvorson et al Microsoft Office Professional Official Manual Aug. 20, 2002, 10 pgs.
Bellavista et al "A Mobile Infrastructure for Terminal User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorialdoc+This+tutorial+focuses+on+the+new+features+introduced+in+VSTO+2005_SE&hl=en&ct=clnk&cd=3&gl=in.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
Seo et al "Hangul Office 2000 Tutoring Book", Sep. 15, 2000, 16 pgs. (Cited in Korean Notice of Rejection dated May 17, 2011).
Office 2007, Microsoft, Released on Nov. 6, 2006, 23 pgs. (Cited in Jun. 9, 2011 OA).
The Discussion Board Component of Blackboard: An Instructor's Guide; Aug. 2004; 23 pgs. (cited in Jan. 6, 2011 OA).
Hock, "Yahoo! to the Max"; May 10, 2005; 5 excerpted pgs. (cited in Jan. 6, 2011 OA).
Homeworking Forum; archived Dec. 6, 2004; 11 pgs. (Cited in Jun. 7, 2011 OA).
Gina Danielle Venolia et al Supporting Email Workflow, revised Dec. 2001; 11 pgs. (cited in OA dated Jan. 6, 2011).
Mock et al "An Experimental Framework for Email Categorization and Management", Sep. 9-12, 2001, 3 pgs. (Search Rpt).
Yang, "Email Categorization Using Fast Machine Learning Algorithms", 2002, 8 pgs. (Search Rpt).
Islam et al "Email Categorization Using Multi Stage Classification Technique", 2007, 3 pgs. (Search Rpt).
"Look and Layout", retrieved at <<http://liv.ac.uk/csd/email/outlook/layout.htm>>, University of Liverpool, retrieved Mar. 3, 2008, 9 pgs. (Search Rpt).
"Preview Pane in Conversation: 4 pane view", 2005, Zinbra Inc., retrieved Mar. 3, 2008, 3 pgs. (Search Rpt).
"Reading Pane in Conversation View", retrieved at <<http://www.zimbra.com/forums/users/5918-reading-pane-conversation-view.html>>, retrieved Mar. 3, 2008, 5 pgs. (Search Rpt).
Ohmori, Yasuo et al "Eigyo Mind—A Sales Support Tool," PFU Tech. Rev., vol. 10, No. 1, pp. 32-38, PFU Limited, May 1, 1999. (cited in Aug. 12, 2011 JP Notice of Rej.).
Dr. Dobb's Journal; "Windows 95 Common Controls"; May 1, 1995; 12 pgs. (cited in Dec. 6, 2011 EP Search Rpt).
Aoyagi, Hideo, "Mail Mac Fan Special 33"; Manichi Communications Inc., Mar. 1, 2004, 5 pgs. (cited in JP NOR Nov. 25, 2011).
Morita, Utako; "Literature Searching System, 'JDream'"; Online Search; vol. 23, No. 4; The Society of Japan Terminal Dec. 2002; 5 pgs. (cited in JP NOR Nov. 25, 2011).
Milstein, Sarah; "The Missing Manual: The book that should have been in the box", First Edition; O'Reilly Japan, Inc.; Nov. 25, 2004; 1 pg. (cited in JP NOR Nov. 25, 2011).
Cole; "New Arrival! Forefront of Downloading"; Mac People; vol. 11, No. 10; ASCII Corporation; Aug. 31, 2005; 1 pg. (cited in JP NOR Nov. 25, 2011).
Sada, Morihiro; "Clue for Managing Common Data Filed on Server"; Business Personal Computer Age; vol. 15, No. 7; Dempa Publications, Inc.; Jul. 1, 1997; 1 pg. (cited in JP NOR Nov. 25, 2011).

(56) References Cited

OTHER PUBLICATIONS

Douglas et al "Dynamic Popup Menu Titles"; IP.Com Journal IP.COM Inc., West Henrietta, NY, Aug. 1, 1992, 2 pgs. (cited in Feb. 28, 2012 Search Report).

Haden et al; "Scrollable Popup Menu with Selection Tracking Display of Graphical Objects"; IP.COM Journal IP.COM Inc., West Henrietta, NY, Aug. 1, 1994, 6 pgs. (cited in Feb. 28, 2012 Search Report).

"Index Card Metaphor for Multiple Property Sheets Associated with a Given Object"; IBM Technical Disclosure Bulletin, International Business Machines Corp., vol. 33, No. 3A, Aug. 1, 1990, 2 pgs. (cited in Feb. 15, 2012 Search Report).

"Menu Selection Method for Related Attributes"; IBM Technical Disclosure Bulletin, International Business Machines Corp., vol. 33, No. 6B, Nov. 1990, 3 pgs. (cited in Feb. 15, 2012 Search Report).

Ribbons; Microsoft; © 2012 Microsoft; http://msdn.microsoft.com/en-us/library/windows/desktop/cc872782.aspx; 45 pgs. (Cited in Apr. 10, 2012 NOA).

AutoCAD 2011—Customization Guide; Feb. 2010; Autodesk, Inc.; http://images.autodesk.com/adsk/files/acad_acg.pdf; 554 pgs. (Cited in Apr. 10, 2012 NOA).

Changing a Graph Type: Ultimate Illustration of Excel 2002 for Windows XP, General Book, X-media Corp., Aug. 31, 2002, p. 224. (cited in May 11, 2012 JP NOR).

Russel et al (hereinafter "Russel"); "Special Edition Using Microsoft ® Office Outlook ® 2003"; Que publishing on Sep. 25, 2003, 71 pgs. (cited in Jun. 6, 2012 OA).

Danish Written Opinion Appl. No. SG 200504508-3 dated Sep. 18, 2006.

Danish Search Report Appl. No. SG 200504475-5 dated Sep. 19, 2006.

NZ Application No. 541301, Examination Report dated Jul. 25, 2005.

NZ Application No. 541300, Examination Report dated Jul. 25, 2005.

NZ Application No. 541299, Examination Report dated Jul. 25, 2005.

Australian Search Report dated Jan. 16, 2007 cited in Singapore Application No. 200504474-8.

PCT Written Opinion and Search Report dated Jan. 9, 2007 cited in International Application No. PCT/US2006/033809.

PCT Search Report dated Feb. 6, 2007 cited in International Application No. PCT/US2006/035467.

PCT Search Report dated Feb. 26, 2007 cited in International Application No. PCT/US2006/034993.

European Communicated dated Oct. 20, 2005 cited in EP Application No. 04102463.0/2211 PCT/.

Australian Written Opinion/Search Report cited in Singapore Application No. 200505257-6 dated Feb. 12, 2007.

International Search Report dated Oct. 17, 2007 cited in International Application No. PCT/US2006/012724.

International Search Report dated Nov. 27, 2007 in PCT/US2007/012573, 9 pages.

Chinese First Office Action dated Mar. 21, 2008 cited in Appln No. 200510092146.4.

Chinese First Office Action dated Mar. 21, 2008 cited in Appln No. 200510092139.4.

Chinese First Office Action dated Apr. 11, 2008 cited in Appln No. 200510092141.1.

Chinese First Office Action dated Apr. 18, 2008 cited in Appln No. 200510092142.6.

Philippines Examiner's Action dated Apr. 21, 2008 cited in Appln No. 1-2005-000405.

Philippines Examiner's Action dated Apr. 21, 2008 cited in Appln No. 1-2005-000406.

Chilean Office Action dated Mar. 28, 2008 cited in Appln No. 1770-05, no English Translation.

Chinese First Office Action dated May 23, 2008 cited in Appln No. 200510089514.X.

European Summons to Attend Oral Proceedings dated Jun. 23, 2008 cited in Appln No. 04102463.9.

Philippines Examiner's Action dated Jul. 31, 2008 cited in Appln No. 12005000495.

Philippines Examiner's Action dated Aug. 19, 2008 cited in Appln No. 12005000405.

Philippines Examiner's Action dated Sep. 12, 2008 cited in Appln No. 1200500406.

Chinese Second Office Action dated Oct. 10, 2008 cited in Appln No. 200510092141.1.

Chinese Second Office Action dated Oct. 17, 2008 cited in Appln No. 200510092139.4.

Chinese Second Office Action dated Nov. 21, 2008 cited in Appln No. 200510089514.X.

European Search Report dated Nov. 25, 2008 cited in Application EP 06 79 0087.

Chilean Office Action dated Nov. 27, 2008 cited in Appln No. 1768-2005.

Chilean Office Action dated Sep. 23, 2008 cited in Appln No. 1770-2005.

Chilean Office Action dated Nov. 27, 2008 cited in Appln No. 1769-2005.

Mexican Office Action dated Feb. 5, 2009 cited in Appln No. PA/a/2005/008349.

Mexican Office Action dated Mar. 3, 2009 cited in Appln No. PA/a/2005/008351 English language only.

Chilean Second Office Action dated Mar. 4, 2009 cited in Appln No. 2512-2005.

European Office Action mailed Mar. 9, 2009, cited in Appln No. 06790087.8.

Chinese Office Action dated Apr. 3, 2009 cited in Appln No. 200510089514.X.

Supplementary European Search Report dated Jun. 9, 2009 cited in EP Application No. 07795391.7-1225.

Mexican Office Action dated Jun. 19, 2009 cited in Appln. No. PA/a/2005/007073.

Chinese Third Office Action dated Jun. 19, 2009 cited in Appln No. 200510092139.4.

Russian Office Action dated Jun. 24, 2009 cited in Appln No. 2005120363/28(023023).

Chinese Office Action dated Jul. 3, 2009 cited in Appln. No. 200680018095.3.

Russian Office Action dated Jul. 21, 2009 cited in Appln No. 2005125837/09(029011).

Russian Office Action dated Jul. 30, 2009 cited in Appln No. 2005125831/09(029005).

Israeli Office Action dated Sep. 6, 2009 cited in Appln No. 169716.

Israeli Office Action dated Sep. 7, 2009 cited in Appln No. 169718.

European Search Report dated Sep. 7, 2009 cited in EP Application No. 09006972.5-2211.

Russian Office Action dated Sep. 10, 2009 cited in Appln No. 2005125836/09(029010).

Russian Office Action dated Sep. 10, 2009 cited in Appln No. 2005125839/09(029013).

European Communication dated Sep. 14, 2009 cited in Appln. No. 07795391.7-1225.

European Communication dated Sep. 28, 2009 cited in Appln No. 09006972.5-2211.

New Zealand Office Action dated Oct. 14, 2009 cited in NZ Application No. 566363.

Chinese Office Action dated Oct. 16, 2009 cited in Appln No. 200510092142.6.

Russian Office Action dated Oct. 26, 2009 cited in Appln No. 2005120363/09(023023).

Chilean Second Office Action dated Nov. 4, 2009 cited in Appln No. 1770-2005.

Chinese Office Action dated Nov. 27, 2009 cited in Appln No. 200680033212.3.

PCT Search Report and Written Opinion dated Nov. 30, 2009 cited in International Application No. PCT/US2009/046341.

Chilean Second Office Action dated Dec. 4, 2009 cited in Appln No. 1768-2005.

(56) References Cited

OTHER PUBLICATIONS

Russian Office Action dated Dec. 28, 2009 cited in Appln No. 2005125836/09(029010).
PCT Search Report and Written Opinion dated Dec. 29, 2009 cited in International Application No. PCT/US2009/046344.
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Mexican Office Action dated May 4, 2010 cited in Appln No. 2005/008354.
Australian Office Action dated May 28, 2010 cited in Appln No. 2005202717.
European Office Action dated Jun. 15, 2010 cited in EP Application No. 06814358.5.
Israeli Office Action dated Jul. 5, 2010 cited in Appln No. 169718.
Chinese Second Office Action dated Jul. 6, 2010 cited in Appln No. 200680033212.3.
Russian Office Action dated Jul. 26, 2010 cited in RU Application No. 2008109034, w/translation.
Mexican Office Action dated Aug. 12, 2010 cited in Appln No. 2005/008354.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Israeli Office Action dated Oct. 28, 2010 cited in Appln No. 169716.
Chinese Second Office Action dated Oct. 29, 2010 cited in Appln No. 200680030421.2.
Chinese Office Action dated Nov. 11, 2010 cited in CN Application No. 200680032789.2, w/translation.
Russian Office Action dated Nov. 12, 2010 cited in Application No. 2008109034, w/translation.
PCT Written Opinion and Search Report dated Nov. 29, 2010 cited in International Application No. PCT/US2010/034277.
Mexican Office Action dated Jan. 6, 2011 cited in Appln No. PA/a/2005/008354.
Australian OA dated Jan. 17, 2011 cited in Application No. 2006287408.
Notice on Reexamination dated Jan. 21, 2011 cited in Appln No. 200510089514.X.
Chinese Third Office Action dated Feb. 10, 2011 cited in Appln No. 200680033212.3.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Chinese Second Office Action dated Apr. 7, 2011 cited in Application No. 200680032789.2, w/translation.
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Korean Notice of Rejection dated May 17, 2011 cited in Appln No. 1-2004-48176.
Chinese Second Office Action dated May 19, 2011 cited in Appln No. 200780020312.7.
Mexican Office Action dated May 26, 2011 cited in Appln. No. MX/a/2009/004151.
Japanese Office Action dated Jun. 10, 2011 cited in JP Application No. 2008-530229, w/translation.
Russian Office Action dated Jun. 14, 2011 cited in Appln No. 2008147090.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2011 cited in Appln. No. PH1707009.
4th Official Notice, Mailing No. 134052, dated Sep. 16, 2011 cited in Appln. No. PH1707009.
Mexican Office Action Summary, dated Sep. 22, 2011 cited in Appln. No. MX/a/2008/003342.
Mexican Office Action dated Oct. 3, 2011 cited in Appln. No. MX/a/2008/014849.
Korean Notice of Rejection dated Nov. 3, 2011 cited in Appln No. 10-2005-0067257.
Japanese Notice of Rejection dated Nov. 4, 2011 cited in Appln No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Japanese Notice of Rejection dated Nov. 25, 2011 cited in Appln. No. 2008-531249.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.
Japanese Notice of Rejection dated Dec. 16, 2011 cited in Appln No. 2008-529218.
Korean Notice of Rejection dated Jan. 30, 2012 cited in Appln No. 10-2004-0048176.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
Japanese Notice of Rejection dated Feb. 3, 2012 cited in Appln No. 2008-530218.

(56) References Cited

OTHER PUBLICATIONS

Taiwan Office Action dated Feb. 8, 2012 cited in Appln No. 94123640, with Eng Lang Summary.
European Search Report dated Feb. 23, 2012 cited in Appln No. 05107153.8.
European Search Report dated Feb. 28, 2012 cited in Appln No. 05107184.3.
Chinese Office Action dated Feb. 29, 2012 cited in Appln No. 200980124664.9.
European Search Report dated Mar. 1, 2012 cited in Appln No. 05107157.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
Taiwan Search Report dated Mar. 14, 2012 cited in Appln No. 094123420.
European Search Report dated Mar. 26, 2012 cited in Appln No. 05107186.6.
Taiwan Notice of Allowance dated Mar. 29, 2012 cited in Appln No. 10120306600.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.
India First Examination Report dated Mar. 30, 2012 cited in Appln No. 1817/DEL/2005.
Japanese Notice of Allowance dated Apr. 11, 2012 cited in Appln No. 2008-530229.
Chinese Fourth Office Action dated Apr. 27, 2012 cited in Appln No. 200680018095.3.
Israeli Office Action dated May 3, 2012 cited in Appln No. 169718.
Taiwan Office Action dated May 14, 2012 cited in Appln No. 94122180, with Eng Lang Summary.
Japanese Notice of Rejection dated May 11, 2012 cited in Appln No. 2009-513223.
Mexican Office Action dated Jun. 6, 2012 cited in Appln. No. MX/a/2008/014849.
Chinese Second Office Action dated in Jun. 18, 2012 in Appln No. 200910148820.4.
U.S. Official Action dated Dec. 23, 2003 in U.S. Appl. No. 09/896,384.
U.S. Official Action dated Apr. 27, 2006 in U.S. Appl. No. 10/800,056.
U.S. Final Official Action dated Oct. 19, 2006 in U.S. Appl. No. 10/800,056.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jul. 26, 2006 in U.S. Appl. No. 10/741,407.
U.S. Final Official Action dated Jan. 23, 2007 in U.S. Appl. No. 10/741,407.
U.S. Official Action dated Jan. 4, 2007 in U.S. Appl. No. 10/607,020.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Feb. 22, 2008 in U.S. Appl. No. 11/445,393.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 28, 2008 in U.S. Appl. No. 10/982,073.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 20, 2008 in U.S. Appl. No. 10/955,928.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.
U.S. Official Action dated Oct. 8, 2008 in U.S. Appl. No. 11/445,393.
U.S. Official Action dated Oct. 28, 2008 in U.S. Appl. No. 11/151,686.
U.S. Official Acton dated Nov. 13, 2008 in U.S. Appl. No. 11/430,562.
U.S. Official Action dated Nov. 25, 2008 in U.S. Appl. No. 11/154,278.
U.S. Official Action dated Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.

(56) References Cited

OTHER PUBLICATIONS

U.S. Official Action dated Jun. 11, 2009 in U.S. Appl. No. 11/151,686.
U.S. Official Acton dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 15, 2009 in U.S. Appl. No. 11/217,071.
U.S. Official Action dated Sep. 23, 2009 in U.S. Appl. No. 11/401,470.
U.S. Official Action dated Oct. 5, 2009 in U.S. Appl. No. 11/332,822.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated Apr. 23, 2010 in U.S. Appl. No. 12/144,642.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jun. 25, 2010 in U.S. Appl. No. 11/332,822.
U.S. Official Action dated Jul. 1, 2010 in U.S. Appl. No. 11/782,059.
U.S. Official Action dated Jul. 6, 2010 in U.S. Appl. No. 10/955,967.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 16, 2010 in U.S. Appl. No. 12/144,642.
U.S. Official Action dated Sep. 21, 2010 in U.S. Appl. No. 11/217,071.
U.S. Official Action dated Sep. 27, 2010 in U.S. Appl. No. 10/836,154.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Feb. 11, 2011 in U.S. Appl. No. 11/401,470.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
U.S. Official Action dated Jun. 7, 2011 in U.S. Appl. No. 11/332,822.
U.S. Official Action dated Jun. 9, 2011 in U.S. Appl. No. 12/464,584.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Aug. 3, 2011 in U.S. Appl. No. 12/142,927.
U.S. Official Action dated Sep. 13, 2011 in U.S. Appl. No. 12/372,386.
U.S. Official Action dated Sep. 14, 2011 in U.S. Appl. No. 12/163,758.
U.S. Official Action dated Oct. 25, 2011 in U.S. Appl. No. 12/144,642.
U.S. Official Action dated Nov. 2, 2011 in U.S. Appl. No. 10/836,154.
U.S. Official Action dated Jan. 12, 2012 in U.S. Appl. No. 11/782,059.
U.S. Official Action dated Jan. 26, 2012 in U.S. Appl. No. 12/464,584.
U.S. Official Action dated Feb. 27, 2012 in U.S. Appl. No. 12/372,386.
U.S. Official Action dated Mar. 14, 2012 in U.S. Appl. No. 12/142,927.
U.S. Official Action dated Apr. 5, 2012 in U.S. Appl. No. 12/163,758.

(56) References Cited

OTHER PUBLICATIONS

U.S. Official Action dated Apr. 19, 2012 in U.S. Appl. No. 13/102,633.
U.S. Official Action dated Apr. 26, 2012 in U.S. Appl. No. 11/782,059.
U.S. Official Action dated May 8, 2012 in U.S. Appl. No. 12/144,642.
U.S. Official Action dated Jun. 6, 2012 in U.S. Appl. No. 12/777,287.
U.S. Official Action dated Jun. 19, 2012 in U.S. Appl. No. 12/769,787.
U.S. Official Action dated May 14, 2008 in U.S. Appl. No. 10/780,547.
U.S. Official Action dated Feb. 20, 2009 in U.S. Appl. No. 10/780,547.
U.S. Official Action dated Sep. 15, 2009 in U.S. Appl. No. 10/780,547.
U.S. Official Action dated Mar. 3, 2010 in U.S. Appl. No. 10/780,547.
U.S. Official Action dated Jun. 7, 2011 in U.S. Appl. No. 12/059,644.
U.S. Official Action dated Jan. 25, 2012 in U.S. Appl. No. 12/059,644.
U.S. Appl. No. 14/841,698, filed Aug. 31, 2015 entitled "Accessing an Out-Space User Interface for a Document Editor Program".
Malaysia Substantive Examination Report dated Jun. 30, 2015 in Appln No. PI 2010005439, 2 pgs.
Canadian Office Action dated Aug. 3, 2015 in Appln No. 2,724,201, 5 pgs.
Korean Notice of Preliminary Rejection dated Sep. 30, 2015 in Appln No. 10-2010-7028097, 7 pgs.
Canadian Office Action dated Oct. 16, 2015 in Appln No. 2,724,681, 7 pgs.
Korean Notice of Preliminary Rejection dated Oct. 19, 2015 in Appln No. 10-2010-7028989, 7 pgs. (No English Language Translation).
U.S. Official Action dated Sep. 14, 2015 in U.S. Appl. No. 12/142,927, 31 pgs.
U.S. Official Action dated Oct. 1, 2015 in U.S. Appl. No. 13/427,939, 25 pgs.
U.S. Official Action dated Nov. 10, 2015 in U.S. Appl. No. 14/150,531, 31 pgs.
U.S. Official Action dated Jul. 22, 2015 in U.S. Appl. No. 12/059,644, 35 pgs.
U.S. Appl. No. 14/981,404, filed Dec. 28, 2015 entitled "Command User Interface for Displaying Selectable Software Functionality Controls".
Inoue, Risako, "Learn from Demonstration How to Use Power Point", In Nikkei PC21, Nikkei Business Publications, vol. 13, Issue 7, Apr. 1, 2008, pp. 168-171 (No English Translation provided).
Chinese Decision on Reexamination dated Feb. 1, 2012 cited in Appln No. 200510089514.X; 23 pgs.
Mexican Office Action dated Feb. 3, 2012 cited in Appln No. MX/A/2008/002889 with summary; 12 pgs.
Israeli Office Action dated Feb. 23, 2012 cited in Appln No. 170668; 20 pgs.
Malaysian Substantive Examination Report dated Nov. 14, 2014 in Appln No. PI 2010005637, 3 pgs.
Canadian Office Action issued in Application No. 2,848,700, dated Oct. 15, 2015, 4 Pages.
Japanese Office Action Issued in Patent Application No. 2014-163396, dated Oct. 21, 2015, 5 Pages.
Canadian Office Action Issued in Patent Application No. 2,512,155, dated Nov. 30, 2015, 7 Pages.
Chinese Fifth Office Action dated Dec. 16, 2015 in Appln No. 200910148820.4, 6 pgs.
Norway Office Action dated Jan. 22, 2016 in Appln No. 20054097, 1 pg.
Notice of Allowance dated Nov. 20, 2015 in U.S. Appl. No. 13/769,598, 15 pgs.
U.S. Office Action dated Jan. 4, 2016 in U.S. Appl. No. 13/615,668, 28 pgs.
International Preliminary Report on Patentability Issued in PCT Application No. PCT/US09/34618, dated Oct. 5, 2010, 7 Pages.
Chinese Office Action Issued in Patent Application No. 200980112454.5, dated Jun. 5, 2012, 8 Pages.
Chinese Second Office Action Issued in Patent Application No. 200980112454.5, dated Apr. 2, 2013, 7 Pages.
Korean Office Action Issued in Patent Application No. 10-2010-7024459, dated Nov. 25, 2015, 9 Pages.
Mexican Office Action Issued in Patent Application No. MX/a/2010/010506, dated Nov. 20, 2015, 7 Pages.
EP Communication dated Jan. 5, 2016 in Appln. No. 09 727 331.2, 4 pgs.
EP Communication dated Mar. 23, 2016 in Appln No. 06 790 087.8, 6 pgs.
European Extended Search Report in Application No. 10775348.5, dated Jun. 2, 2014, 6 Pages.
Israeli Office Action Issued in Patent Application No. 221792, dated Feb. 16, 2016, 4 pgs.
Korean Notice of Final Rejection in Application 10-2010-7028097, dated Apr. 28, 2016, 4 pgs. (No English translation).
Korean Notice of Final Rejection in Application 10-2010-7026989, dated Apr. 28, 2016, 4 pgs. (No English translation).
Korean Office Action in Application 10-2011-7026740, dated Mar. 11, 2016, 4 Pages.
Malaysian Adverse Report in Application PI 2011003348, dated Mar. 15, 2016, 3 pgs.
Norway Office Action dated in Appln No. 20053655, dated Mar. 2, 2016, 3 pgs.
Notice of Allowance dated Mar. 15, 2016 in U.S. Appl. No. 14/032,094, 30 pgs.
U.S. Official Action dated Mar. 21, 2016 in U.S. Appl. No. 13/437,031, 41 pgs.
U.S. Appl. No. 14/032,094, Notice of Allowance dated Apr. 18, 2016, 2 pgs.
U.S. Appl. No. 13/769,598, Notice of Allowance dated Apr. 7, 2016, 4 pgs.
Korean Notice of Preliminary Rejection Issued in Patent Application No. 10-2011-7018813, dated Jan. 8, 2016, 4 Pages.
U.S. Official Action dated Jan. 29, 2016 in U.S. Appl. No. 14/142,132, 149 pgs.
U.S. Appl. No. 12/142,927, Office Action dated Apr. 7, 2016, 21 pgs.
Yaser, "Microsoft Office Word 2003", Retrieved from: <<http://www.just.edu.jo/~yaser/courses/cs98/slides/Microsoft%20Office%20Word%202003.ppt>>, 2003. 49 Pages.
Word 2003 Introduction. Retrieved from: <<http://www.photoshoplondon.com/www/training-manuals/Word2003Intro.pdf>>, The Mouse Training Company, Sep. 9, 1999, 166 Pages.
Canadian Office Action issued in Patent Application No. 2724681, dated Apr. 15, 2016, 5 Pages.
Canadian Office Action issued in Patent Application No. 2848700, dated May 2, 2016, 04 Pages.
Malaysian Substantive Examination Adverse Report in Application PI 2011004990, dated Mar. 15, 2016, 3 pgs.
U.S. Appl. No. 14/226,421, Office Action dated May 6, 2016, 18 pgs.
U.S. Appl. No. 14/150,531, Office Action dated May 20, 2016, 22 pgs.
U.S. Appl. No. 13/427,939, Office Action dated May 25, 2016, 18 pgs.
U.S. Appl. No. 11/332,822, Notice of Allowance dated Jul. 6, 2016, 9 pgs.
U.S. Appl. No. 14/032,094, Notice of Allowance dated Jun. 24, 2016, 8 pgs.
European Office Action in Application 05107186.8, dated Jul. 27, 2016, 6 pgs.
European Office Action in Application 05107153.8, dated Jul. 22, 2016, 6 pgs.
Canadian Notice of Allowance in Application 2750422, dated Mar. 10, 2016, 1 page.

(56) References Cited

OTHER PUBLICATIONS

Chilean Notice of Allowance in Application 201101987, dated Mar. 30, 2016, 2 pgs; (w/o English translation).
Korean Office Action in Patent Application No. 10-2011-7018813, dated Jul. 29, 2016, 3 pgs; w/o English translation).
U.S. Appl. No. 14/142,132, Notice of Allowance dated Aug. 3, 2016, 17 pgs.
U.S. Appl. No. 11/332,822, Amendment and Response filed Aug. 11, 2016, 7 pgs.
U.S. Appl. No. 14/226,421, Amendment and Response filed Aug. 5, 2016, 8 pgs.
U.S. Appl. No. 13/925,523, Office Action dated Aug. 2, 2016, 7 pgs.
U.S. Appl. No. 13/615,668, Amendment and Response filed Jun. 2, 2016, 12 pgs.
U.S. Appl. No. 14/032,094, Notice of Allowance dated Aug. 9, 2016, 2 pgs.
U.S. Appl. No. 13/427,939, Amendment and Response filed Aug. 3, 2016, 14 pgs.
U.S. Appl. No. 12/028,797, Notice of Allowance dated Feb. 27, 2015, 14 pgs.
Canadian Office Action in Application 2512155, dated Aug. 26, 2016, 4 pgs.
Chilean Office Action in Application 200501770, dated Sep. 2, 2016, 2 pgs. (no English translation).
Chilean Office Action in Application 200501769, dated Sep. 2, 2016, 2 pgs. (no English translation).
U.S. Appl. No. 11/332,822, Notice of Allowance dated Aug. 26, 2016, 9 pgs.
U.S. Appl. No. 14/226,421, Notice of Allowance dated Aug. 31, 2016, 7 pgs.
U.S. Appl. No. 13/615,668, Office Action dated Sep. 1, 2016, 18 pgs.
"2007 Microsoft Office System Is Golden", Microsoft News Center, Nov. 6, 2006, 23 Pages.
"User Interface Architecture", Retrieved from <<http://www.datamaster2003.com/uiarchitecture.htm>>, 2003, 2 Pages.
Australia Notice of Allowance Issued in Patent Application No. 2010216342, dated Jun. 25, 2014, 2 Pages.
Australian Notice of Allowance Issued in Patent Application No. 2005203411, dated Jul. 15, 2010, 3 Pages.
Barr, Jim, "Gmail Tips—The Complete Collection", Retrieved Date: Dec. 15, 2004, https://web.archive.org/web/20041215091758/http://g04.com/misc/GmailTipsComplete.html,18 pgs.
Bateman, et al., "Towards Constructive Text, Diagram, and Layout Generation for Information Presentation", In Association for Computational Linguistics, vol. 27, Issue 3, Sep. 2001, pp. 409-449.
Canada Notice of Allowance Issued in Patent Application No. 2,848,667, dated Oct. 6, 2015, 1 Page.
Canadian Notice of Allowance Issued in Patent Application No. 2512047, dated Oct. 2, 2014, 1 Page.
Chile Office Action Issued in Patent Application No. 1770-2005, dated Feb. 9, 2010, 7 Pages. (W/out English translation).
Chile Office Action Issued in Patent Application No. 1770-2005, dated Mar. 13, 2009, 10 Pages, with English translation.
Chilean Office Action in Appln. No. 2005-01769, dated Jul. 15, 2005, 11 pgs. (with English translation).
Chinese Notice of Allowance Issued in Patent Application No. 200510092142.6, dated Jun. 18, 2010, 4 Pages.
Communication Pursuant to Rule 69 EPC Issued in European Patent Application 05107153.8, dated Apr. 2, 2012, 1 Page.
Egyptian Office Action Issued in Patent Application No. 3712005, dated Apr. 9, 2010, 4 Pages.
European Office Action in Appln. No. 05107157.9, dated Jul. 20, 2016, 6 pgs.
European Office Action Issued in Patent Application 05107153.8, dated Apr. 2, 2012, 1 Page.
European Search Report Issued in Patent Application No. 09727331.2, dated Aug. 1, 2014, 1 Page.
Feiner, Steven, "A Grid-Based Approach to Automating Display Layout", In Book Readings in Intelligent User Interfaces, Morgan Kaufmann Publishers Inc., pp. 249-254.
Fifth Office Action Issued in Chinese Patent Application 200980112454.5, dated Apr. 2, 2014, 19 Pages.
First Office Action Issued in Chinese Patent Application 200980112454.5, dated Aug. 26, 2011, 9 Pages.
Furman, et al., "Positioning HTML Elements with Cascading Style Sheets", W3C Working Draft, Aug. 19, 1997, 14 Pages.
Gajos, et al., "Supple: Automatically Generating User Interfaces", In Proceedings of the 9th International Conference on Intelligent User Interfaces, Jan. 13, 2004, pp. 1-8.
Israel Office Action in Application 169718, dated Oct. 17, 2013, 4 pages. (with English translation).
Israel Office Action in Application 233533, dated May 31, 2016, 2 pgs. (W/out English Translation).
Israel Office Action Issued in Patent Application No. 169717, dated Oct. 26, 2009, 2 Pages.
Jacobs, et al., "Adaptive Grid-Based Document Layout", In Proceedings of ACM transactions on Graphics, SIGGRAPH 2003, vol. 22, Issue 3, Jul. 2003, 11 Pages.
Japanese Notice of Allowance Issued in Patent Application No. 2005-236089, dated Aug. 23, 2011, 6 Pages.
Japanese Office Action Issued in Patent Application No. 2005-236089, dated Sep. 20, 2011, 2 Pages.
Kim, et al., "Migrating Legacy Software Systems to CORBA based Distributed Environments through an Automatic Wrapper Generation Technique", In Proceedings SCI 2000 and the 6th International Conference on Information Systems Analysis and Synthesis ISAS 2000, vol. 10, Aug. 9, 2001, 6 Pages.
Korean Notice of Allowance Issued in Patent Application No. 10-2005-0067411, dated Mar. 12, 2012, 2 Pages. (Without English Translation).
Louw, et al., "Extensible Web Browser Security", In Proceedings of the 4th International Conference on Detection of Intrusions and Malware, and Vulnerability Assessment, Jul. 12, 2007, 20 Pages.
Malaysian Notice of Allowance Issued in Patent Application No. PI20053258, dated Oct. 15, 2012, 2 Pages.
Mexican Notice of Allowance Issued in Patent Application No. PA/a/2005/008349, dated Dec. 16, 2014, 1 Page. (No English translation).
New Zealand Application No. 541299, Examination Report dated Nov. 8, 2006, 1 page.
Non-Final Office Action Issued in U.S. Appl. 10/780,547, dated Oct. 4, 2007, 16 Pages.
Norway Notice of Allowance Issued in Patent Application No. 20053656, dated Jun. 22, 2015, 2 Pages. (W/out English Translation).
Norway Office Action dated Sep. 15, 2015 in Appln. No. 20053658, 1 page (no English translation).
Norway Office Action Issued in Patent Application No. 20053656, dated Feb. 22, 2014, 5 Pages.
Office Action Issued in Mexican Patent Application No. MX/a/2011/008461, dated May 19, 2016, 10 Pages. (No English Translation).
Office Action Issued in Philippines Patent Application 1200500404, dated Apr. 12, 2011, 1 Page.
Office Action Issued in Russian Patent Application 200512583709, dated Oct. 30, 2009, 5 Pages. (English translation).
Parry, Dominic Charles, "CREWS: A Component-Driven, Run-Time Extensible Web Service Framework", In Thesis Submitted in fulfilment of the requirements for the Degree of Master of Science, Rhodes University, Dec. 2003, 103 Pages.
Philippines Office Action Issued in Patent Application No. PH12005405, dated Jan. 19, 2006, 1 Page.
Russian Notice of Allowance Issued in Patent Application No. 2005125837, dated Jul. 10, 2010, 23 Pages.
Selca, et al., "Customizing the Office Fluent User interface in Access 2007", Retrieved from <<http://msdn.microsoft.com/en-us/library/bb187398(printer).aspx>>, Dec. 2006, 22 Pages.
Shih, et al., "A Stepwise Refinement Approach to Multimedia Presentation Designs", In IEEE International Conference on Sys-

(56) References Cited

OTHER PUBLICATIONS tems, Man, and Cybernetics Computational Cybernetics and Simulation, vol. 1, Oct. 12, 1997, pp. 117-122.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
Supplementary Search Report Issued in European Patent Application 09727331.2, dated Jul. 16, 2014, 6 Pages.
Supplementary Search Report Issued in European Patent Application 09767220.8, dated Jan. 30, 2013, 8 Pages.
Supplementary Search Report Issued in European Patent Application 09798374.6, dated May 10, 2013, 6 Pages.
Taiwan Notice of Allowance Issued in Patent Application No. 102112935, dated Aug. 31, 2015, 4 Pages.
Taiwan Notice of Allowance Issued in Patent Application No. 94123640, dated Mar. 12, 2013, 4 Pages. (with English translation).
Taiwan Notice of Allowance Issued in Patent Application No. 98145363, dated Aug. 13, 2015, 4 Pages.
Thailand Notice of Allowance in Application 0501003162, dated Sep. 13, 2016, 1 page. No English translation.
U.S. Appl. No. 10/780,547, Office Action dated Jun. 14, 2007, 6 Pages.
U.S. Appl. No. 10/800,056, Advisory Action dated Feb. 14, 2007, 3 pgs.
U.S. Appl. No. 10/955,967, Notice of Allowance dated Apr. 10, 2012, 18 Pages.
U.S. Appl. No. 12/372,386 Notice of Allowance dated Mar. 10, 2015, 3 Pages.
U.S. Appl. No. 12/372,386, Notice of Allowance dated Mar. 23, 2015, 5 Pages.
U.S. Appl. No. 13/427,939, Office Action dated Sep. 13, 2016, 13 pgs.
U.S. Appl. No. 14/032,094, Notice of Allowance dated Sep. 30, 2016, 9 pgs.
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.
U.S. Appl. No. 11/332,822, Notice of Allowance dated Sep. 14, 2016, 2 pgs.
Berliner E.M. et al., "Microsoft Office 2003", Feb. 24, 2004, p. 173-178 [D2], "Using the Insert Menu. Inserting and Formatting a Picture in Word", 13 pgs.
Berliner E.M. et al., "Microsoft Office 2003", Feb. 24, 2004, p. 39-40, 120-124, 175-177, 233-234 [D1], "Viewing a Document in the Microsoft Office 2003 Application Window", 23 pgs.
Canadian Office Action dated Feb. 19, 2015 in Appln. No. 2,848,667, 5 pgs.
Canadian Office Action dated Oct. 30, 2013 in Appln. No. 2,512,047; 3 pgs.
EP Communication dated Jan. 10, 2013 cited in Appln. No. 10744106.5, PCT/US2010/021888, 8 pgs.
EP Communication dated Sep. 26, 2012 cited in Appln. No. PCT/US2006/034993; 10 pgs.
EP Search Report dated Apr. 18, 2013 in Appln No. PCT/US2006/012724, 12 pgs.
EP Search Report dated Jan. 30, 2013 in Appln No. PCT/US2009/044059, 8 pgs.
EP Search Report dated May 10, 2013 cited in Appln No. PCT/US2009/044292; 6 pgs.
European Search Report dated Feb. 28, 2012 cited in Appln No. 05107184.3; 8 pgs.
Israeli Office Action dated Oct. 12, 2009 cited in Appln No. 170668; 2 pgs.
U.S. Notice of Allowance dated Apr. 10, 2007 in U.S. Appl. No. 10/741,407, 8 pgs.
U.S. Notice of Allowance dated Aug. 24, 2004 in U.S. Appl. No. 09/896,384, 9 pgs.
U.S. Notice of Allowance dated Jul. 5, 2007 in U.S. Appl. No. 10/607,020, 6 pgs.
U.S. Official Action dated Dec. 29, 2010 in U.S. Appl. No. 12/028,797, 16 pgs.
Korean Notice of Allowance Issued in Application 10-2011-7026740, dated Sep. 8, 2016, 2 Pages. (w/o English Translation).
European Notice of Allowance in Application 05107184.3, dated Aug. 31, 2016, 7 pgs.
Taiwan Notice of Allowance in Appln No. 101133155, dated Sep. 4, 2015, 4 pgs.
U.S. Appl. No. 11/332,822, Notice of Allowance dated Nov. 8, 2016, 3 pgs.
U.S. Appl. No. 11/332,822, Notice of Allowance dated Dec. 12, 2016, 2 pgs.
U.S. Appl. No. 14/150,531, Notice of Allowance dated Nov. 29, 2016, 5 pgs.
U.S. Appl. No. 14/226,421, Notice of Allowance dated Nov. 30, 2016, 8 pgs.
U.S. Appl. No. 13/925,523, Notice of Allowance dated Dec. 6, 2016, 5 pgs.
U.S. Appl. No. 12/142,927, Notice of Allowance dated Jan. 9, 2017, 10 pgs.
U.S. Appl. No. 13/437,031, Office Action dated Dec. 27, 2016, 8 pgs.
U.S. Appl. No. 13/615,668, Notice of Allowance dated Jan. 9, 2017, 10 pgs.
U.S. Appl. No. 14/032,094, Notice of Allowance dated Jan. 6, 2017, 9 pgs.
U.S. Appl. No. 12/142,927, Notice of Allowance dated Jan. 30, 2017, 7 pgs.
U.S. Appl. No. 13/427,939, Notice of Allowance dated Jan. 17, 2017, 9 pgs.
Canadian Office Action in Application 2848700, dated Jan. 26, 2017, 4 pgs.
European Summons to Attend Oral Hearing in Application 05105584.6, mailed Jul. 22, 2016, 6 pgs.
Indian Office Action in Application 01489/DELNP/2008, dated Aug. 31, 2015, 3 pgs.
Korean Notice of Allowance in Application 10-2016-7034274, dated Jan. 31, 2017, 2 pgs. (no English translation).
Brazilian Office Action Issued in Patent Application No. PI0505014-6, dated Jan. 5, 2017, 6 Pages. (with English translation).
U.S. Appl. No. 12/142,927, Notice of Allowance dated Mar. 3, 2017, 2 pgs.
U.S. Appl. No. 10/607,020, Notice of Allowance dated Feb. 28, 2017, 20 pgs.
U.S. Appl. No. 13/615,668, Notice of Allowance dated Feb. 21, 2017, 2 pgs.
U.S. Appl. No. 14/032,094, Notice of Allowance dated Mar. 16, 2017, 2 pgs.
U.S. Appl. No. 13/427,939, Notice of Allowance dated Feb. 9, 2017, 2 pgs.
U.S. Appl. No. 13/427,939, Notice of Allowance dated Feb. 22, 2017, 3 pgs.
U.S. Appl. No. 14/226,421, Notice of Allowance dated Mar. 13, 2017, 8 pgs.
U.S. Appl. No. 14/150,531, Notice of Allowance dated Feb. 17, 2017, 5 pgs.
European Office Action in Application 06814334.6, dated Jan. 31, 2017, 5 pgs.
U.S. Appl. No. 14/816,844, filed Aug. 3, 2015 entitled "Accessing an Out-Space User Interface for a Document Editor Program".
U.S. Appl. No. 14/665,112, filed Mar. 23, 2015 entitled "Hirearchically-Organized Control Galleries".
Redmond, Tony; Excerpt from Book; Microsoft Exchange Server 2003; Published 2003; 14 pgs.
Microsoft Office 2007 Word Help, 3 pgs. (cited in Dec. 31, 2012 OA).
Alexander, Keeping New Messages Marked 'Unread' (2007), http://certcities.com/editorial/colums/story.asp?EditorialsD=243, 2 pgs. (cited in Dec. 31, 2012 OA).

(56) References Cited

OTHER PUBLICATIONS

Wiley, Microsoft® Office Outlook® 2007 for Dummies®, 9 pgs. (cited in Dec. 31, 2012 OA).
Miser, "Special Edition Using Mac OS X v10.2"; Pub. Date Jan. 3, 2003; QUE; Spe. Ed.; pp. 272-275. (cited in Apr. 18, 2013 OA).
Mori et al "Design and Development of Multidevice User Interfaces through Multiple Logical Descriptions"; Aug. 2004; vol. 30; 14 pgs. (cited in Apr. 25, 2013 NOA).
Inoue; "Let's Learn PowerPoint Using Actual Samples"; Nikkei PC21, Japan, Nikkei Business Publications, Inc., Apr. 1, 2008, vol. 13, No. 7. (cited in Jan. 9, 2014 JP OA).
Ramamritham et al Scheduling Algorithms and Operating Systems Support for Real-Time Systems; © 1994; IEEE; 13 pages. (cited in May 7, 2014 NOA).
Zweben et al Scheduling and Rescheduling with Iterative Repair, © 1993; IEEE; 9 pages. (cited in May 7, 2014 NOA).
Ringel et al., "Automated Message Prioritization: Making Voicemail Retrieval More Efficient"; In CHI'02 Extended Abstracts on Human Factors in Computing Systems; Apr. 20, 2002; pp. 592-593.
Kumar et al., "A personal agent application for the semantic web"; In AAAI Fall Symposium on Personalized Agents; 2002; pp. 1-8.
Gorniak, Peter; "Sorting email messages by topic" 1998; 1 pg.
Maes et al., "Learning Interface Agents"; In AAAI (vol. 93); 1993; pp. 459-465.
Microsoft Office XP/2002, Wikipedia, http://en.wikipedia.org/wiki/Microsoft_Office_XP, May 31, 2001 (May 31, 2001); 3 pgs. (cited in Sep. 4, 2014 CA OA).
Akamatsu, "Touch with a Mouse, A Mouse Type Interface Device with Tactile and Force Display"; © IEEE; 1995; 5 pgs. (cited in Nov. 24, 2014 NOA).
Embedding and Linking Excel Worksheets into Word; 2001, The McGraw-Hill Companies, Inc, 6 pgs. (cited in Dec. 24, 2014 OA).
"Microsoft Office 2003 Editions Product Guide", Published on: Sep. 2003, Available at: tp://www.google.ca/url?sa=t&rct=j&q=&esrc=s& frm=1&source=web&cd=3&ved=0CCoQFjAC&url=http%3A%2F%2Fdownload.microsoft.com%2Fdownload%2F0%2Ff%2F1%2FF0f1d5b1f-53bc-47c3-bf6f-ac6d67cf9766%2FOffice2003Guide.doc&ei=CKTkVPBCgb-xBL6qgvAH&usg=AFQjCNEpNk4IFH6m27BXr481Kv1kRXo_xA, 167 pgs. (cited in Feb. 19, 2015 CA OA).
Baker; "Configuring the Pages Pane in Acrobat"; Apr. 22, 2004; Planet PDF; 4 pgs. (cited in Mar. 19, 2015 NOA).
Murray; First Look 2007 Microsoft Office System; Jun. 21, 2006; Microsoft Press; 16 pgs. (cited in Mar. 19, 2015 NOA).
Schwartz, Microsoft Office 2007 for Windows: Visual QuickStart Guide, 11 pgs. (cited in Mar. 27, 2015 OA).
Lyons et al., The Oval Menu-Evolution and Evaluation of a Wedget, © 1996; IEEE; 8 pgs. (cited in Apr. 16, 2015 NOA).
Israeli Office Action dated Jun. 3, 2012 cited in Appln No. 189293; 4 pgs.
Mexican Office Action Summary dated Jun. 25, 2012 in Appln No. PA/a/2005/008354; 25 pgs.
Chinese Office Action dated Jul. 2, 2012 in Appln No. 200980124944.7; 8 pgs.
Korean Notice of Preliminary Rejection dated Jul. 2, 2012 cited in Appln No. 10-2012-0024393; 5 pgs.
Chinese Office Action dated Jul. 12, 2012 in Appln No. 201080008789.5; 8 pgs.
Korean Notice of Preliminary Rejection dated Jul. 19, 2012 cited in Appln No. 10-2007-7024571; 6 pgs.
Chinese Decision on Rejection dated Jul. 31, 2012 cited in Appln No. 200680018095.3; 17 pgs.
Chinese Office Action dated Aug. 2, 2012 in Appln No. 200980124945.1; 8 pgs.
Chinese Third Office Action dated Aug. 14, 2012 in Appln No. 200980124383.0; 8 pgs.
Israeli Office Action dated Aug. 29, 2012 in Appln No. 169717; 4 pgs.
Malaysian Examination Report dated Aug. 30, 2012 in Appln No. PI 20080400; 3 pgs.
Chinese Second Office Action dated Sep. 12, 2012 in Appln No. 200980124944.7; 13 pgs.
Mexican Office Action Summary dated Sep. 18, 2012 in Appln No. MX/a/2008/003342; 8 pgs.
Chilean Second Office Action dated Sep. 21, 2012 cited in Appln No. 1560-2010, w/English Language Summary; 8 pgs.
EP Communication dated Sep. 26, 2012 cited in Appln No. PCT/US2006/034993; 10 pgs.
Malaysian Substantive Examination Report dated Oct. 31, 2012 cited in Appln No. PI 20053260, 2 pgs.
Korean Notice of Preliminary Rejection dated Nov. 12, 2012 cited in KR-10-2008-7005939; 7 pgs.
Chilean Second Office Action dated Nov. 21, 2012 cited in Appln No. 1559-2010; 6 pgs.
Canadian Office Action dated Nov. 23, 2012 cited in Appln No. 2,512,102; 5 pgs.
Canadian Office Action dated Nov. 29, 2012 cited in Appln No. 2,512,047; 4 pgs.
Canadian Office Action dated Nov. 29, 2012 cited in Appln No. 2,512,036, 2 pgs.
Canadian Office Action dated Nov. 29, 2012 cited in Appln No. 2,511,101 3 pgs.
Russian Office Action dated Dec. 12, 2012 cited in Appln No. 2010140069, 8 pgs.
Chinese Second Office Action dated Dec. 17, 2012 cited in Appln No. 200980124644.9, 10 pgs.
Chinese Third Office Action dated Dec. 31, 2012 in Appln No. 200980124944.7, 14 pgs.
Chinese Second Office Action dated Dec. 31, 2012 in Appln No. 200980124945.1, 8 pgs.
Chinese Second Office Action dated Jan. 4, 2013 in Appln No. 201080008789.5, 8 pgs.
Chinese Office Action dated Jan. 6, 2013 in Appln No. 201080021957.4, 9 pgs.
EP Communication dated Jan. 10, 2013 cited in Appln No. PCT/US2010/021888, 8 pgs.
Malaysia Substantive Examination Adverse Report dated Jan. 15, 2013 in Appln No. PI 20084401, 3 pgs.
Canadian Office Action dated Jan. 18, 2013 in Appln No. 2,512,155, 6 pgs.
Mexican Office Action dated Jan. 22, 2013 cited in Appln No. MX/a/2008/003342; 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
Korean Notice of Rejection dated Feb. 22, 2013 in Appln No. 10-2008-7005078 13 pgs.
Mexican Office Action dated Feb. 25, 2013 in Appln No. MX/a/2008/002889, 11 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Mexican Office Action dated Mar. 22, 2013 in Appln No. PA/a/2005/008350; 28 pgs.
Chinese Fourth Office Action dated Apr. 23, 2013 cited in Appln No. 200980124944.7, 7 pgs.
Philippines Substantive Examination Report dated Apr. 25, 2013 cited in Appln No. 1-2005-000495; 2 pgs.
Russian Office Action dated May 13, 2013 cited in Appln No. 2010-151922; 7 pgs.
Korean Final Notice of Preliminary Rejection dated May 20, 2013 cited in Appln No. 10-2008-7005939; 3 pgs.
Mexican Office Action dated May 23, 2013 in Appln No. MX/a/2008/003342; 8 pgs.

(56) References Cited

OTHER PUBLICATIONS

Chinese Notice on Third Office Action dated Jun. 5, 2013 cited in Appln No. 200980124644.9; 10 pgs.
Mexican Office Action dated Jun. 11, 2013 in Appln No. PA/a/2005/008351; 31 pgs.
Mexican Office Action dated Jun. 11, 2013 cited in Appln. No. MX/a/2008/003342, 9 pgs.
Mexican Office Action Received in Patent Application No. MX/a/2010/013566, dated Jun. 12, 2013, 3 Pages.
Israeli Office Action dated Jun. 18, 2013 cited in Appln No. 170668; 4 pgs.
Mexican Office Action dated Jun. 20, 2013 in Appln No. MX/a/2010-014056; 6 pgs.
Mexican Office Action dated Jul. 9, 2013 in Appln No. MX/a/2008/002889, 13 pgs.
EP Communication dated Jul. 17, 2013 in Appln No. EP 07 795 391.7; 9 pgs.
Mexican Office Action Issued in Mexico Patent Application No. MX/a/2011/011749, dated Aug. 2, 2013, 6 Pages. (w/o English Translation).
Chinese Second Office Action dated Aug. 5, 2013 in Appln No. 201080021957.4; 12 pgs.
Russian Decision on Grant dated Aug. 12, 2013 in Appln No. 2010151922/08; 18 pgs.
Mexican Office Action dated Aug. 20, 2013 in Appln No. MX/a/2011/011749, 10 pgs.
Israeli Office Action Received in Patent Application No. 209011, dated Sep. 10, 2013, 5 Pages.
Malaysian Notice of Allowance Received in Patent Application No. PI 20080400, dated Sep. 13, 2013, Filed Date: Aug. 29, 2006, 2 Pages.
Canadian Office Action dated Sep. 18, 2013 in Appln No. 2,512,036; 3 pgs.
Japanese Notice of Rejection dated Sep. 19, 2013 in Appln No. 2012-153634; 6 pgs.
Mexican Office Action dated Sep. 27, 2013 in Appln No. MX/a/2008/014849; 9 pgs.
EP Summons to Attend Oral Proceedings dated Oct. 4, 2013 in Appln No. 09 006 972.5; 13 pgs.
Canadian Office Action dated Oct. 7, 2013 in Appln No. 2,650,016; 2 pgs.
Chilean Third Office Action dated Oct. 9, 2013 in Appln No. 2512-2005; 7 pgs.
Israeli Office Action dated Oct. 17, 2013 cited in Appln No. 1611334; 4 pgs.
India First Examination Report dated Oct. 21, 2013 cited in Appln No. 1017/DEL/2004; 2 pgs.
Mexican Office Action dated Oct. 28, 2013 cited in Appln. No. MX/a/2010/013566; 8 pgs.
Korean Notice of Preliminary Rejection dated Nov. 7, 2013 cited in KR-10-2008-7029272; 7 pgs.
Canadian Office Action dated Nov. 15, 2013 in Appln No. 2,512,102; 3 pgs.
Notice of Allowance Received for Korea Republic of (KR) Patent Application No. 10-2008-7005939, dated Nov. 20, 2013, Filed Date: Sep. 12, 2006, 2 Pages. (w/o English Translation).
Chinese Third Office Action dated Dec. 4, 2013 in Appln No. 200680032789.2; 6 pgs.
Canadian Office Action dated Dec. 5, 2013 in Appln No. 2,618,169, 3 pgs.
Japanese Office Action dated Jan. 9, 2014 cited in JP Application No. 2012-510906 w/translation, 4 pgs.
Chinese Decision on Rejection dated Jan. 13, 2014 in Appln No. 200980124644.9, 9 pgs.
Malaysian Substantive Examination Report dated Jan. 15, 2014 in Appln No. PI 20080508, 3 pgs.
Japanese Office Action Issued in Japan Patent Application No. 2012-510906, dated Jan. 16, 2014, 4 Pages.
Japanese Office Action Issued in Patent Application No. 2011-550149, dated Jan. 20, 2014, Filed Date: Jan. 22, 2010, 5 Pages.
EP Communication dated Jan. 27, 2014 in Appln No. 09 767 2208, 7 pgs.
Canadian Office Action dated Jan. 28, 2014 in Appln No. 2,511,101, 4 pgs.
Norway Office Action dated Feb. 10, 2014 in Appln No. 20053655, 4 pgs.
Norway Office Action dated Feb. 10, 2014 in Appln No. 20053658, 4 pgs.
EP Communication dated Feb. 11, 2014 cited in Appln No. 09 798 374.6, 6 pgs.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5, 15 pgs.
Russian Notice of Allowance Issued in Patent Application No. 2010152843, dated Feb. 20, 2014, 16 Pages.
Australian Office Action dated Feb. 28, 2014 in Appln No. 2009262834, 3 pgs.
Australian Office Action dated Feb. 28, 2014 in Appln No. 2009262833, 3 pgs.
Israeli Office Action dated Feb. 28, 2014 in Appln No. 209012, 6 pgs.
Australian Office Action dated Mar. 4, 2014 in Appln No. 2009260596, 4 pgs.
Australian Office Action dated Mar. 4, 2014 in Appln No. 2009271517, 3 pgs.
Israeli Office Action dated Mar. 6, 2014 in Appln No. 194785, 5 pgs.
Australian Office Action Issued in Patent Application No. 2010216342, dated Mar. 14, 2014, Filed Date: Jan. 22, 2010, 3 Pages.
Mexican Office Action Received for Mexican Patent Application No. PA/a/2005/008349, dated Mar. 14, 2014, Filed Date: Aug. 5, 2005, 16 Pages.
Taiwan Office Action dated Mar. 17, 2014 in Appln. No. 98118252, 10 pgs.
India First Examination Report dated Mar. 19, 2014 in Appln No. 1818/DEL/2005, 1 pg.
India First Examination Report Issued in Patent Application No. 1820/DEL/2005, dated Mar. 20, 2014, 1 Page.
Chilean Office Action dated Mar. 30, 2014 in Appln No. 2804-2011, 7 pgs.
Mexican Notice of Allowance Received in Patent Application No. MX/a/2008/002889, dated Apr. 1, 2014, Filed Date: Aug. 29, 2006, 1 Page.
Chinese Third Office Action dated Apr. 3, 2014 in Appln No. 201080021957.4, 6 pgs.
Chilean Office Action Received in Patent Application No. 2804-2011, dated Apr. 4, 2014, 7 Pages. (w/o English Translation).
Russian Notice of Allowance Issued in Patent Application No. 2011134380, dated Apr. 5, 2014, Filed Date: Jan. 22, 2010, 22 Pages.
Australian Notice of Allowance Received for Australia Patent Application No. 2009262833, dated Apr. 16, 2014, Filed Date: Jun. 5, 2009, 2 Pages.
Canadian Office Action dated Apr. 25, 2014 in Appln No. 2,512,155, 9 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30 2014 in Appln No. 2010247882, 3 pgs.
Taiwan Search Report dated May 7, 2014 cited in Appln No. 098117357, 13 pgs.
Japanese Notice of Allowance Issued in Patent Application No. 2011-550149, dated May 8, 2014, Filed Date: Jan. 22, 2010, 4 Pages.
Australian Second Office Action Issued in Patent Application No. 2010216342, dated May 12, 2014, Filed Date: Jan. 22, 2010, 3 Pages.
Taiwan Search Report dated May 12, 2014 cited in Appln No. 098119245, 11 pgs.

(56) References Cited

OTHER PUBLICATIONS

Notice of Allowance Issued in Chinese Patent Application No. 200680032789.2, dated May 15, 2014, Filed Date: Sep. 8, 2006, 3 Pages.
Israeli Office Action dated May 15, 2014 in Appln No. 209047, 6 pgs.
Israeli Office Action dated May 15, 2014 in Appln No. 209048, 15 pgs.
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
EP Search Report dated Jun. 20, 2014 in Appln No. PCT/US2010/034277, 6 pgs.
Japanese Notice of Allowance Issued in Patent Application No. 2012-510906, dated Jul. 10, 2014, 3 Pages. (w/o English Translation).
Russian Decision on Grant dated Jul. 20, 2014 in Appln No. 2010138162, 21 pgs.
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
Canadian Office Action dated Sep. 4, 2014 in Appln No. 2,512,036, 3 pgs.
Canadian Office Action Issued for Patent Application No. 2618169, dated Sep. 9, 2014, 4 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Taiwan Office Action and Search Report Issued in Patent Application No. 98145363, dated Oct. 2, 2014, 25 Pages.
Chilean Office Action dated Oct. 24, 2014 in Appln No. 2804-2011, 5 pgs. (w/o English Translation).
Israel Office Action Issued in Patent Application No. 169717, dated Oct. 29, 2014, 1 Page; (w/o English Translation).
Chinese Decision on Reexamination dated Nov. 18, 2014 in Appln. No. 200910148820.4, 15 pgs.
Norwegian Office Action Received for Patent Application No. 20053656, dated Nov. 19, 2014, 2 pgs.
Norwegian Office Action dated Nov. 29, 2014 in Appln No. 20053658 4 pgs.
Norwegian Office Action dated Nov. 29, 2014 in Appln No. 20053655, 3 pgs.
India First Examination Report dated Dec. 23, 2014 in Appln No. 1819/DEL/2005, 2 pgs.
Indonesian Office Action Issued in Patent Application No. P00200500444, dated Jan. 16, 2015, 3 Pages. (w/o English Translation).
Malaysian Substantive Examination Report dated Jan. 30, 2015 in Appln No. PI 2010005439, 3 pgs.
Malaysian Modified Substantive Examination Report dated Jan. 30, 2015 in Appln No. PI 2010005558, 3 pgs.
Chinese Third Office Action dated Feb. 2, 2015 in Appln No. 200910148820.4, 12 pgs.
Israeli Office Action Issued in Patent Application No. 213908, dated Feb. 3, 2015, 3 pages. (w/o English Translation).
Chinese Fourth Office Action dated Feb. 15, 2015 in Appln No. 200780020312.7, 9 pgs.
India Examination Report dated Feb. 17, 2015 in Appln No. 1568/DEL/2005, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
Israeli Office Action dated Mar. 2, 2015 in Appln No. 213908, 5 pgs.
Korean Notice of Allowance Issued in Patent Application No. 10-2010-7029199, dated Apr. 24, 2015, 2 Pages. (w/o English Translation).
Israeli Office Action Issued in Patent Application No. 215418, dated Apr. 28, 2015, 3 Pages.
India First Examination Report dated May 6, 2015 cited in Appln No. 1979/DELNP/2008, 2 pgs.
EP Communication dated May 18, 2015 cited in 10 775 348.5, 7 pgs.
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Canadian Office Action dated May 26, 2015 cited in Appln No. 2,618,169, 4 pgs.
Canadian Notice of Allowance dated Jun. 2, 2015 in Appln No. 2,512,036, 1 pg.
Chinese Notice on Reexamination dated Jul. 8, 2015 cited in Appln No. 200980124644.9, 8 pgs.
Canadian Office Action dated Jul. 14, 2015 in Appln No. 2,725,046, 5 pgs.
Norwegian Office Action dated Jul. 27, 2015 in Appln No. 20053655, 3 pgs.
Chinese Fourth Office Action dated Aug. 3, 2015 in Appln No. 200910148820.4, 6 pgs.
Russian Office Action dated Dec. 12, 2012 cited in Appln No. 2010140069.
Mexican Office Action dated Apr. 24, 2013 cited in MX/a/2010/010506.
Chinese Third Office Action dated Jul. 18, 2013 cited in Appln No. 200980112454.5, 7 pgs.
Russian Office Action dated Aug. 12, 2013 in Appln No. 2010140069.
Russian Notice of Allowance Received for Russian Federation Patent Application No. 2010140069, dated Nov. 26, 2013, Filed Date: Feb. 20, 2009, 18 Pages.
Australian Examination Report dated Nov. 22, 2013 in Appln No. 2009232301.
Chinese Fourth Office Action dated Dec. 4, 2013 in Appln No. 200980112454.5.
Australian Notice of Allowance Received for Patent Application No. 2009232301, dated Jan. 29, 2014, Filed Date: Feb. 20, 2009, 2 Pages.
European Extended Search Report dated Jul. 16, 2014 in Appln No. PCT/US2009/034618, 6 pgs.
EP Communication dated Aug. 1, 2014 in Appln. No. PCT/US2009/034618, 1 pg.
Korean Office Action Issued in Patent Application No. 10-2010-7024459, dated May 18, 2015, 4 Pages; (w/o English Translation).
U.S. Official Action dated Aug. 7, 2012 in U.S. Appl. No. 10/836,154.
U.S. Official Action dated Sep. 11, 2012 in U.S. Appl. No. 12/163,784.
U.S. Official Action dated Sep. 13, 2012 in U.S. Appl. No. 13/437,031.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
U.S. Official Action dated Dec. 12, 2012 in U.S. Appl. No. 10/851,506, 76 pgs.
U.S. Official Action dated Dec. 12, 2012 in U.S. Appl. No. 12/954,952, 86 pgs.
U.S. Official Action dated Dec. 31, 2012 in U.S. Appl. No. 12/142,927, 49 pgs.

(56) References Cited

OTHER PUBLICATIONS

U.S. Official Action dated Mar. 1, 2013 in U.S. Appl. No. 11/430,562, 66 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Official Action dated Jun. 3, 2013 in U.S. Appl. No. 13/102,633, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 13/769,598, 73 pgs.
U.S. Official Action dated Dec. 6, 2013 in U.S. Appl. No. 10/851,506, 25 pgs.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
U.S. Official Action dated Apr. 18, 2014 in U.S. Appl. No. 11/782,059, 42 pgs.
U.S. Official Action dated Apr. 25, 2014 in U.S. Appl. No. 12/028,797, 42 pgs.
U.S. Official Action dated May 14, 2014 in U.S. Appl. No. 13/615,668, 34 pgs.
U.S. Official Action dated May 30 2014 in U.S. Appl. No. 13/027,289, 188 pgs.
U.S. Official Action dated Jun. 2, 2014 in U.S. Appl. No. 13/769,598, 32 pgs.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
U.S. Official Action dated Aug. 25, 2014 in U.S. Appl. No. 13/464,572, 117 pgs.
U.S. Official Action dated Sep. 10, 2014 in U.S. Appl. No. 12/954,952, 52 pgs.
U.S. Official Action dated Sep. 11, 2014 in U.S. Appl. No. 13/427,939, 133 pgs.
U.S. Official Action dated Sep. 18, 2014 in U.S. Appl. No. 11/782,059, 41 pgs.
U.S. Official Action dated Sep. 30, 2014 in U.S. Appl. No. 13/595,084, 185 pgs.
U.S. Official Action dated Oct. 10, 2014 in U.S. Appl. No. 11/332,822, 47 pgs.
U.S. Official Action dated Oct. 24, 2014 in U.S. Appl. No. 13/615,668, 35 pgs.
U.S. Official Action dated Nov. 28, 2014 in U.S. Appl. No. 13/437,031, 100 pgs.
U.S. Official Action dated Dec. 24, 2014 in U.S. Appl. No. 13/102,633, 42 pgs.
U.S. Official Action dated Jan. 15, 2015 in U.S. Appl. No. 12/028,797, 47 pgs.
U.S. Official Action dated Feb. 24, 2015 in U.S. Appl. No. 13/769,598, 33 pgs.
U.S. Official Action dated Feb. 24, 2015 in U.S. Appl. No. 11/782,059, 37 pgs.
Notice of Allowance dated Mar. 19, 2015 in U.S. Appl. No. 13/464,572, 40 pgs.
U.S. Official Action dated Mar. 27, 2015 in U.S. Appl. No. 12/142,927, 68 pgs.
Notice of Allowance dated Apr. 16, 2015 in U.S. Appl. No. 13/595,084, 19 pgs.
U.S. Official Action dated Apr. 23, 2015 in U.S. Appl. No. 11/332,822, 40 pgs.
U.S. Official Action dated Apr. 29, 2015 in U.S. Appl. No. 13/427,939, 43 pgs.
U.S. Official Action dated Jun. 12, 2015 in U.S. Appl. No. 13/615,668, 26 pgs.
U.S. Official Action dated Jun. 17, 2015 in U.S. Appl. No. 13/437,031, 12 pgs.
U.S. Official Action dated Jun. 19, 2015 in U.S. Appl. No. 14/150,531, 135 pgs.
U.S. Official Action dated Jun. 24, 2015 in U.S. Appl. No. 13/769,598, 20 pgs.
U.S. Official Action dated Jun. 30, 2015 in U.S. Appl. No. 11/782,059, 30 pgs.
Notice of Allowance dated Jul. 28, 2015 in U.S. Appl. No. 13/595,084, 15 pgs.
U.S. Official Action dated Aug. 29, 2012 in U.S. Appl. No. 12/059,644.
U.S. Official Action dated Jun. 21, 2013 in U.S. Appl. No. 12/059,644.
U.S. Official Action dated Feb. 14, 2014 in U.S. Appl. No. 12/059,644, 20 pgs.
U.S. Official Action dated Sep. 29, 2014 in U.S. Appl. No. 12/059,644, 37 pgs.
U.S. Appl. No. 13/615,668, Notice of Allowance dated Apr. 13, 2017, 2 pgs.
U.S. Appl. No. 14/032,094, Notice of Allowance dated Apr. 13, 2017, 2 pgs.
U.S. Appl. No. 13/427,939, Notice of Allowance dated Apr. 7, 2017, 2 pgs.
U.S. Appl. No. 14/150,531, Notice of Allowance dated Apr. 19, 2017, 2 pgs.
U.S. Appl. No. 12/142,927, Notice of Allowance dated May 3, 2017, 2 pgs.
U.S. Appl. No. 14/032,094, USPTO Reponses after Amendment after Allowance dated Apr. 14, 2017, 2 pgs.
U.S. Appl. No. 13/615,668, USPTO Response to Amendment after Allowance dated May 16, 2017, 2 pgs.
European Decision to Refuse and Minutes in Oral Proceeding in Application 05105584.6, mailed Mar. 28, 2017, 20 pgs.
Indian Office Action in Application 08037/CHENP/2010, dated Mar. 29, 2017, 7 pgs.

(56) References Cited

OTHER PUBLICATIONS

Brazilian Office Action Issued in Patent Application No. PI0506116-4, dated Apr. 20, 2017, 5 Pages. (with English Summary).
Brazilian Office Action in Application PI0506081-8, dated Jun. 21, 2017, 7 pages.
European Decision to Refuse and Minutes in Oral Proceeding in Application 05105584.6, dated Mar. 28, 2017, 20 pgs.
Thailand Office Action in Application 0501003163, dated Aug. 22, 2017, 3 pgs.
Thailand Office Action in Application 0501003164, dated Aug. 22, 2017, 3 pgs.
European Summons to Attend Oral Proceedings in Application 05107157.9, dated Sep. 15, 2017, 7 pgs.
European Decision to Refuse in Application 09767220.8, dated Sep. 18, 2017, 4 pages.
U.S. Appl. No. 14/665,112, Notice of Allowance dated Sep. 8, 2017, 16 pgs.
U.S. Appl. No. 14/226,421, Office Action dated Nov. 2, 2017, 8 pgs.
U.S. Appl. No. 14/665,112, USPTO Response after 312 Amendment dated Oct. 4, 2017, 2 pgs.
U.S. Appl. No. 14/981,404, Office Action dated Nov. 1, 2017, 16 pgs.

\* cited by examiner

Fig. 7

COMMAND USER INTERFACE FOR DISPLAYING MULTIPLE SECTIONS OF SOFTWARE FUNCTIONALITY CONTROLS

CROSS-REFERENCE TO RELATED APPLICATIONS

This application is a continuation of U.S. patent application, Ser. No. 12/372,386, now U.S. Pat. No. 9,015,621, filed Feb. 17, 2009, entitled Command User Interface For Displaying Multiple Sections of Software Functionality Controls, which is a continuation in part of U.S. patent application, Ser. No. 10/955,967, now U.S, Pat. No. 8,255,828, filed Sep. 30, 2004, entitled Command User Interface For Displaying Selectable Functionality Controls, which applications are incorporated herein by reference. To the extent appropriate, a claim of priority is made to each of the above-recited applications.

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

After a user selects a desired functionality control, or if the user moves the mouse cursor to a different location, the drop-down menu typically disappears. If the user determines that functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located. Such a method of searching for desired functionality is cumbersome and time-consuming, particularly for less experienced users, and when new functionality is added by developers of the software application, the new functionality may never be utilized unless the user is somehow educated as to its existence.

Accordingly, there is a need in the art for an improved functionality command user interface for displaying selectable software functionality controls and for presenting logical groupings of particular functionality controls associated with a selected top-level functionality. It is with respect to these and other considerations that the present invention has been made.

SUMMARY

Embodiments of the present invention solve the above and other problems by providing an improved user interface for displaying selectable software functionality controls and for presenting logical groupings of particular functionality controls associated with a selected top-level functionality. Generally, aspects of the present invention provide for organization of the functionality of a given software application into task-based modes. The modes are associated with tabs in a ribbon-shaped user interface, and the tabs are labeled with descriptive text associated with different functionality modes or tasks. Underneath a row of top-level functionality tabs, functionalities associated with a given top-level functionality tab are presented in logical groupings. Selection of a particular tab populates the user interface with controls for functionalities associated with the selected tab.

According to an embodiment of the invention, methods and systems for providing functionality from a software application via an improved user interface are provided. A plurality of functionalities available from one or more software applications is organized according to one or more tasks that may be performed with the software application. A user interface tab for each of the one or more tasks is provided in the user interface. Upon receiving an indication of a selection of a given user interface tab, one or more selectable functionality controls are displayed in the user interface for selecting one or more functionalities organized under a given task associated with the selected user interface tab.

According to another embodiment, if the user interface contains available display space after the display one or more selectable functionality controls in response to receiving an indication of a selection of a given user interface tab, the available display space may be used to display additional selectable functionality controls associated with an additional user interface tab associated with a different task. According to this embodiment, two or more top-level functionality tabs and the functionality control sections containing logical groupings of particular functionality controls associated with the selected top-level functionality tabs may be displayed in the user interface. That is, selection of a first top-level functionality tab may cause the display in a first portion of the user interface a first set of selectable functionality controls associated the selected first top-level functionality tab, and selection of a second or subsequent top-level functionality tab may cause the display in a second or subsequent portion of the user interface a second or subsequent set of selectable functionality controls associated with the selected second or subsequent top-level functionality tab. Alternatively, the second or subsequent portion of the user interface may be populated with a second or subsequent set of selectable functionality controls associated with the context of an edited object. For example, editing a picture object in a text document may cause the display of a set of functionality controls associated with picture editing in an empty space in the user interface adjacent to a presently displayed set of functionality controls associated with a previously selected top-level functionality tab. In addition, a user may change how space is divided between adjacent portions of the user interface containing different sets of functionality controls. Thus, embodiments enable users to have multiple sets of tools available simultaneously and allow users to optimize the space available in a user interface.

These and other features and advantages will be apparent from a reading of the following detailed description and a review of the associated drawings. It is to be understood that both the foregoing general description and the following detailed description are explanatory only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 7 illustrates a computer screen display showing a drop-down menu of functionalities associated with a selected functionality presented in the ribbon-shaped user interface illustrated in FIGS. 2 through 4.

DETAILED DESCRIPTION

Figure 1:
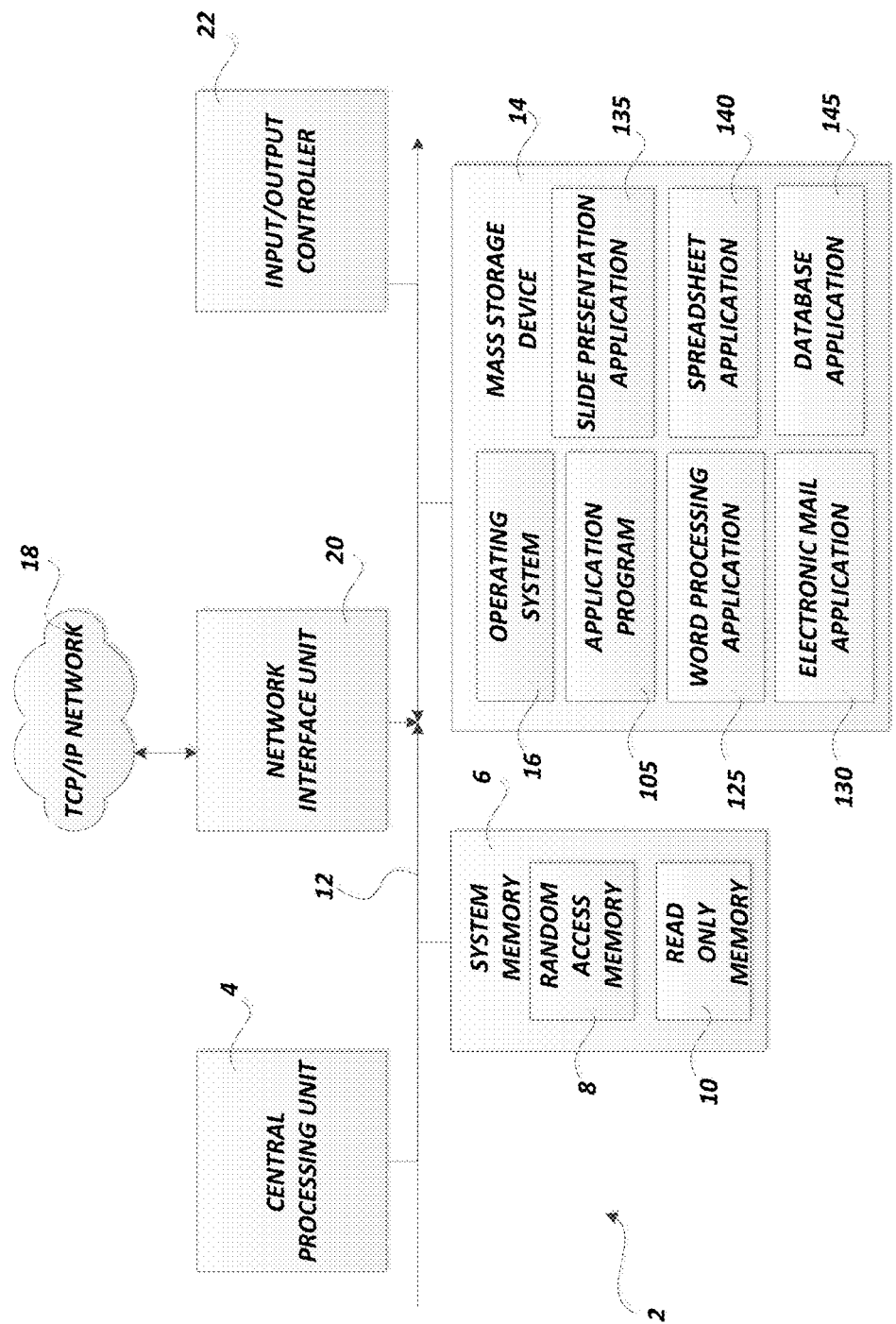
FIG. 1 is a block diagram showing the architecture of a personal computer that provides an illustrative operating environment for embodiments of the present invention.

As briefly described above, embodiments of the present invention are directed to an improved user interface for displaying selectable software functionality controls associated with task-based functionality and for presenting logical groupings of particular functionality associated with a selected task-based functionality. As will be described in detail below, when one task-based functionality tab is selected from the user interface of the present invention, selectable functionality controls provided by the associated software application for performing aspects of a task related to the selected task-based functionality tab are presented in a functionality control section within a ribbon-shaped user interface above a workspace in which the user is entering or editing a document or object. The selectable functionality controls presented in the user interface are grouped into logical groupings for more efficient utilization. For example, if a word processing application is used, and the user selects the "Writing" tab, the ribbon-shaped user interface may be populated by functionalities associated with writing tasks such as "Clipboard" tools (e.g., "Cut," "Copy," "Paste," etc.), "Formatting" tools (e.g., "Alignment," "Font Style," "Font Size," etc.), "Writing" tools (e.g., "Find/Replace," "Insert Symbol," "AutoCorrect," etc.), and "View" tools (e.g., "Document Map," "Thumbnails," "Ruler," etc.).

Upon selection of a different task-based functionality tab, the selectable functionality controls associated with the subsequently selected task-based functionality may either replace the selectable functionality controls associated with the previously selected task-based functionality or be displayed in a separate functionality control section adjacent to the first functionality control section in the user interface depending upon various factors such as user preference and/or amount of screen space available due to monitor resolution, screen size, application window size, use of multiple monitors, etc. Alternatively, the second or subsequent portion of the user interface may be populated with a second or subsequent set of selectable functionality controls associated with the context of an edited object. For example, editing a picture object in a text document may cause the display of a set of functionality controls associated with picture editing in an empty space in the user interface adjacent to a presently displayed set of functionality controls associated with a previously selected top-level functionality tab.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules comprising the multiple functionality application 105 include a word processing application 125, a slide presentation application 135, a spreadsheet application 140 and a database application 145. An example of such a multiple functionality application 105 is OFFICE manufactured by Microsoft Corporation. Other software applications illustrated in FIG. 1 include an electronic mail application 130.

Figure 2:
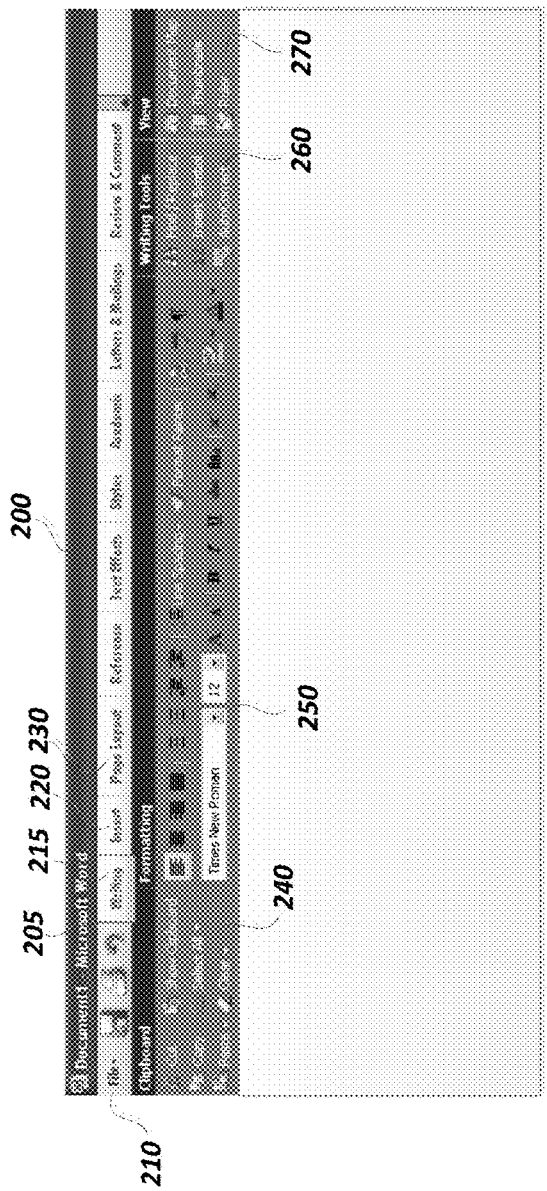
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a functionality control section containing a plurality of functionalities available under a selected top-level functionality tab. As briefly described above, the improved user interface of the present invention includes a ribbon-shaped user interface for displaying controls associated with task-based functionality available under a given software application, such as the software application 105 illustrated in FIG. 1. A first section 210 of the user interface 200 includes generic controls for functionality not associated with a particular task, such as word processing versus spreadsheet data analysis. For example, the section 210 includes controls for general file commands such as "file open," "file save" and "print." According to one embodiment of the present invention, the controls included in the first section 210 are controls that may be utilized by a variety of software applications comprising a multiple functionality application 105. That is, the controls included in the first section 210 may be controls that are generally found and used across a number of different software applications.

Controls included in the first section 210 may be utilized for all such applications comprising such a multiple functionality application, but other controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document. A task-based tab may be activated by a user via a plurality of methods including but not limited to selection via a pointing device (e.g. a mouse), shortcut key, voice command, or selection or mouse-over action over an element within a document that has functionalities associated with it.

As should be appreciated, many other task-based tabs or controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such controls as a cut control, a copy control, a paste control, a select all control, etc. Adjacent to the clipboard section 240, a second logical grouping 250 is presented under the heading "Formatting." Controls presented in the "Formatting" section 250 may include such controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc.

Figure 3:
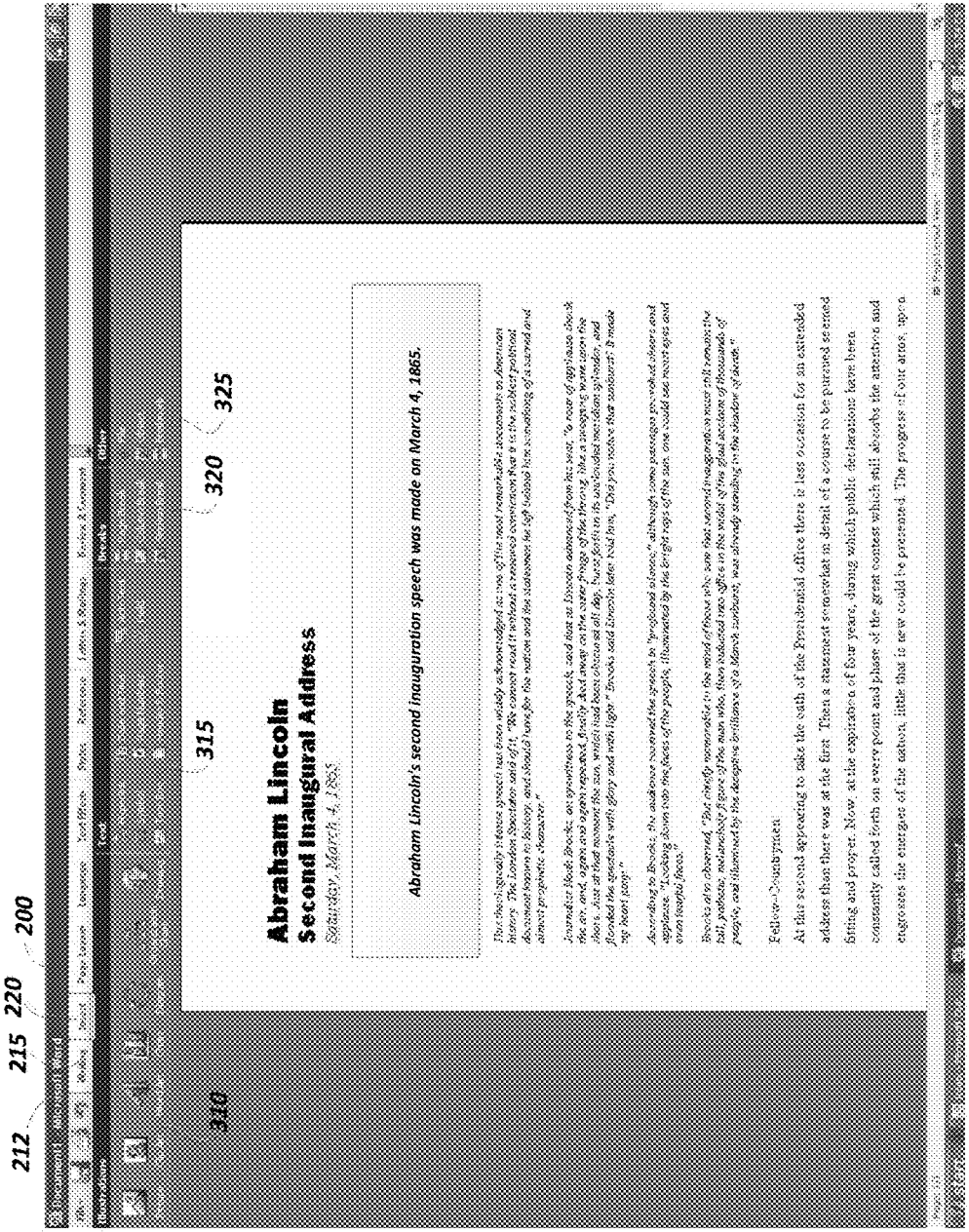
FIG. 3 illustrates a computer screen display showing the user interface illustrated in FIG. 2 whereby a different set of functionalities is presented associated with a different top-level functionality tab.

According to one embodiment, as described below with reference to FIGS. 3 and 4, upon selection of a different task-based tab from the tab section, a different functionality control section containing logical groupings of selectable functionality controls is presented in the user interface 200 associated with the selected task-based tab. As illustrated in FIG. 3, the "Insert" task tab 220 is selected, and the selectable functionality controls presented in the user interface 200 are changed from those illustrated in FIG. 2 to include selectable functionality controls associated with the insert task. For example, a first logical grouping 310 of selectable functionality controls is illustrated under a heading "Illustrations." The illustrations section 310 includes controls for allowing a user to insert into the application workspace a variety of illustrations such as pictures, clip art, word art, charts, diagrams, organization charts, drawings and the like. A second logical grouping 315 of selectable functionality controls is provided under the heading "Text" and provides selectable functionality controls for inserting text-type objects or data into the user's workspace. For example, controls contained in the text section 315 include hyperlink, symbol, text box, date and time, page numbers, headers and footers, etc. A third logical grouping 320 of selectable functionality controls is presented under the heading "Breaks." This section includes selectable functionality controls for inserting breaks such as page breaks, column breaks, section breaks, etc.

Figure 4:
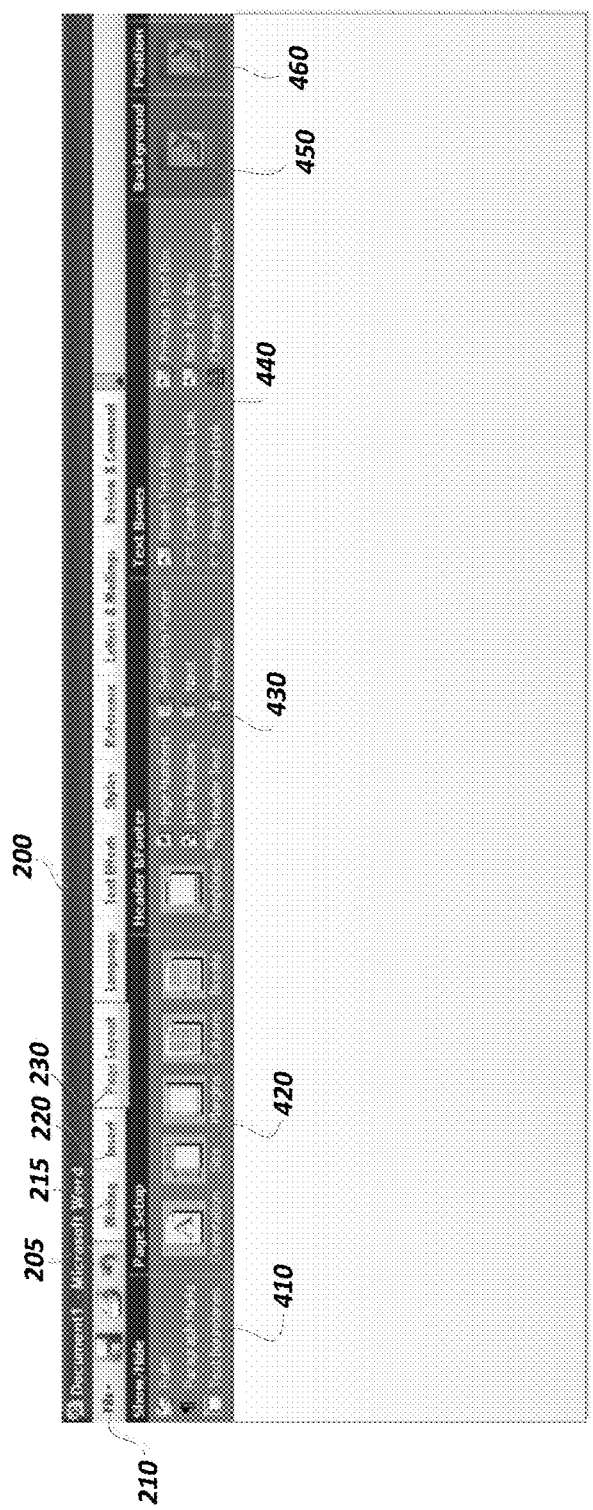
FIG. 4 illustrates a computer screen display showing the user interface illustrated in FIG. 2 whereby a different set of functionalities is presented associated with a different top-level functionality tab.

Referring to FIG. 4, the user interface 200 illustrated in FIGS. 2 and 3 is illustrated wherein the "Page Layout" tab 230 is selected. Upon selection of the "Page Layout" tab 230, selectable functionality controls associated with performing page layout tasks are presented to the user in logical groupings 410, 420, 430, 440, 450, 460. For example, a first logical grouping 410 is illustrated under the heading "Show/Hide" and includes selectable functionality controls associated with showing or hiding page layout information such as ruler information, paragraph markings, text boundaries, and the like. A second section 420 is grouped under a heading "Page Setup." The page setup section 420 includes selectable functionality controls for adjusting or editing a page's orientation, size, margins, column settings, page layout breaks, etc. A third section 430 is presented under a heading "Header & Footer." This section 430 includes selectable functionality controls for software application functionality related to inserting and editing header and footer information.

Along the right edge of the user interface 200 is included a "Background" section 450 and a "Position" section 460. According to the user interface illustrated in FIG. 4, these selectable functionality control sections are closed or collapsed. That is, the user interface 200, as illustrated in FIG. 4, has insufficient space for displaying individual selectable functionality controls under each of these two sections. Accordingly, these two sections are closed from view. As should be appreciated, depending upon the screen size available for displaying the user interface 200 or depending upon the display settings utilized by a given user of the user interface 200, varying amounts of space will be available for displaying the task-based tabs and associated selectable functionality controls. Accordingly, when insufficient space is available in the user interface 200 for displaying all logical groupings associated with a given task-based tab, a determination may be made at application run time as to any logical groupings that must be collapsed or closed until the associated task-based tab is selected. Similarly, if the user manually reduces the size of the user interface 200, a determination is made as to the available space for displaying selectable functionality control sections, and certain selectable functionality control sections are collapsed as required. As should be appreciated, a determination may be made as to the order of collapsing selectable functionality control sections such that a criteria, such as "most used" or "most recently used" may be used for determining which selectable functionality control sections are displayed and which sections are collapsed as the available space in the user interface is decreased.

According to an alternate embodiment, if the user interface 200 lacks sufficient space to display all logical groupings of functionality controls associated with a given task-based tab, the size of the display of individual logical groupings is reduced to allow space for the display of all associated logical groupings. According to one aspect of this embodiment, different sizes of groupings displays, for example small, medium and large, may be defined. At display time, a determination may be made as to the available space. At a starting point, the largest size for each applicable logical grouping display is presented. As required, the display size is reduced (i.e., large to medium to small) for each logical grouping until each grouping fits in the available space. In addition, for smaller logical grouping display layouts, text labels may be shortened or eliminated, and the layout of individual controls contained in given groupings may be rearranged to allow for more efficient use of space.

According to embodiments of the present invention, selection of a closed or collapsed selectable functionality control section, such as the sections 450, 460 causes a rearrangement of the user interface 200 for presenting the selectable functionality controls associated with the selected section. That is, as should be appreciated, one or more of the other presently fully displayed sections may be collapsed in order to make room for the selectable functionality controls of a previously closed or collapsed section. Alternatively, all selectable functionality controls presently displayed in the user interface 200 may remain displayed as is, and selectable functionality controls contained under a selected closed or collapsed section may be displayed in a drop-down display that is presented vertically below the selected closed or collapsed section or that is displayed horizontally underneath the user interface 200. Alternatively, the selectable functionality controls associated with a selected closed or collapsed section may be displayed in a pop-up menu or text box.

According to embodiments of the present invention, customization of the displayed selectable functionality control sections may be performed. That is, the selectable functionality control sections under a given selected task tab may be reordered according to the particular needs of a given user, and certain sections may be hidden from view if the functionality associated with those sections are never used by a given user. Or, a presently displayed selectable functionality control section may be manually collapsed in order to make space in the user interface 200 for the display of a selectable functionality control section that is presently closed or collapsed due to insufficient space in the user interface 200.

According to embodiments of the present invention, a user may browse through available selectable functionality controls using a mouse-over action. During the mouse-over action, the displayed functionality is dynamically changed relative to a tab or functionality control on which the mouse cursor is focused at a given time. For example, referring to FIGS. 2, 3, 4, if a user clicks and holds the mouse cursor over the "Writing" tab, the selectable functionality controls sections and associated controls are displayed. If the user does not see desired functionality controls, the user may mouse-over to a second tab, for example, the "Insert" tab 220, and the selectable functionality controls groupings associated with the "Insert" tab are dynamically displayed as illustrated in FIG. 3. If the user sees a desired control in one of the selectable functionality controls sections or groupings under the "Insert" tab, for example, the user may select the desired control for application to a selected document or object. After the user selects the desired control or command, the user interface 200 reverts back to the display that was presented to the user before the user started the mouse-over action. That is, a display of the selectable functionality control sections of the finally selected control does not remain displayed in the user interface 200. The user interface 200 returns to the original display prior to the mouse-over action.

Figure 5:
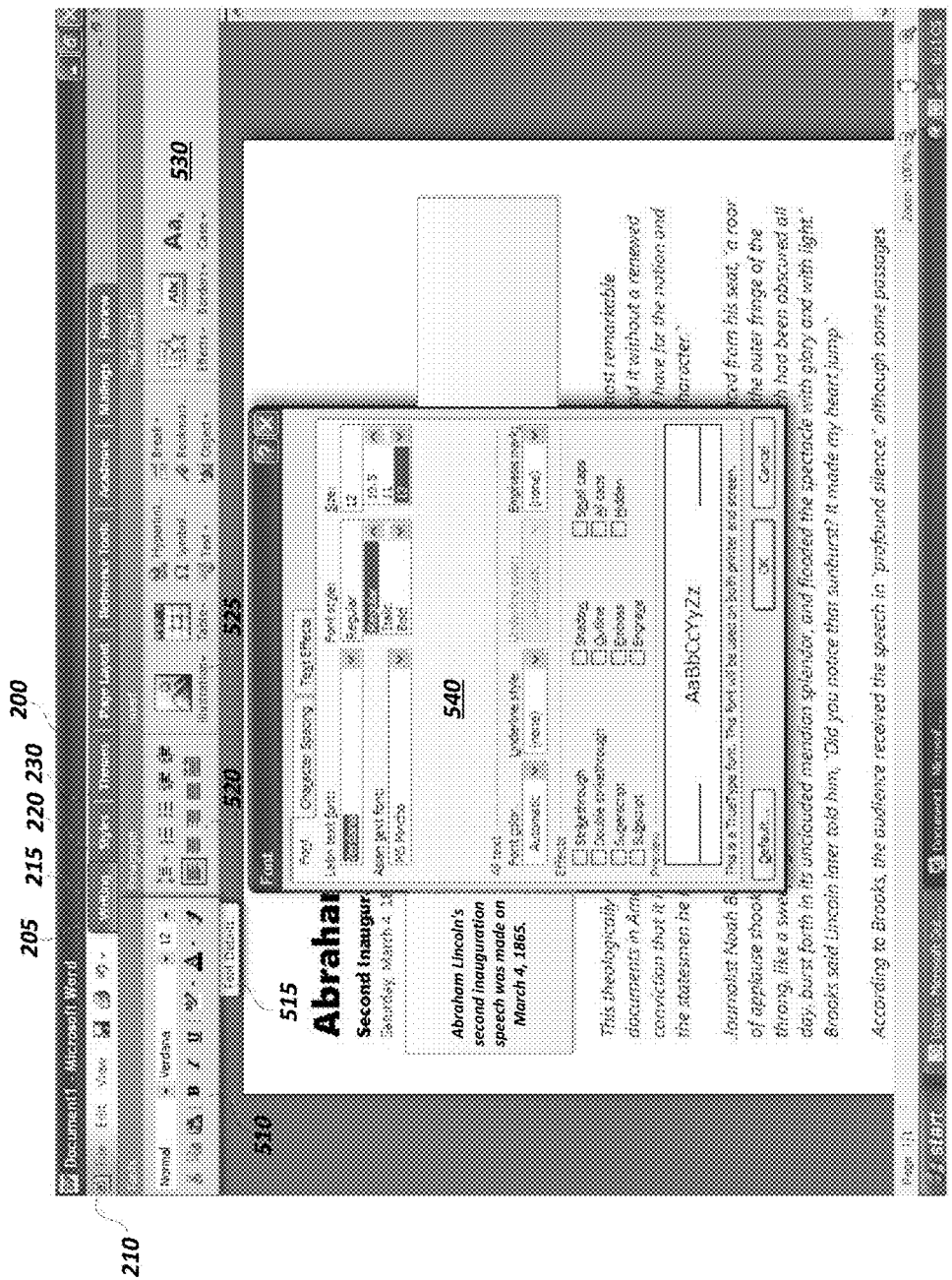
FIG. 5 illustrates a computer screen display showing a pop-up user interface for providing detailed functionality associated with a selected subset of functionalities presented in the ribbon-shaped user interface illustrated in FIGS. 2 through 4.

As should be appreciated by those skilled in the art, because of space limitations in the sections of the user interface 200 containing logical groupings of selectable functionality controls, not all functionality that may be desired or utilized by a given user of the software application may be accessible by selecting one of the controls presented in a given section. Many additional functionalities may be available that may be associated with, or otherwise related to a given selectable functionality control section under a selected task-based tab. Referring now to FIG. 5, if a user requires the use of additional functionality not presented in a given selectable functionality control section, or if the user desires detailed information regarding the attributes of a document or object according to the application of functionality presented in a given selectable functionality control section, a dialog 540 may be launched to provide additional selectable functionality controls, or to provide detailed information regarding the application of functionality to a document or object.

For example, as illustrated in FIG. 5, selection of the "Fonts' selectable functionality control section 510 causes the deployment of a "Font Details" tab 515 below the section 510. Selection of the "Font Details" tab 515 causes deployment of the "Font" dialog 540 to provide the user detailed information as to the application of particular functionality, for example fonts, to a selected document or object and provides the user additional selectable functionality not presented to the user in the selectable functionality control section 510. As should be appreciated, the "Font Details" tab 515 may be deployed each time the user focuses a mouse cursor in any portion of the section 510 to alert the user that the user may selectively launch the dialogue 540 if desired. Alternatively, other mechanisms may be used for deploying the tab 515 such as selecting the section heading, for example "Fonts" for the section 510, or selecting any area within the section 510 not associated with a particular control, or right clicking the "Fonts" section 510.

Figure 6:
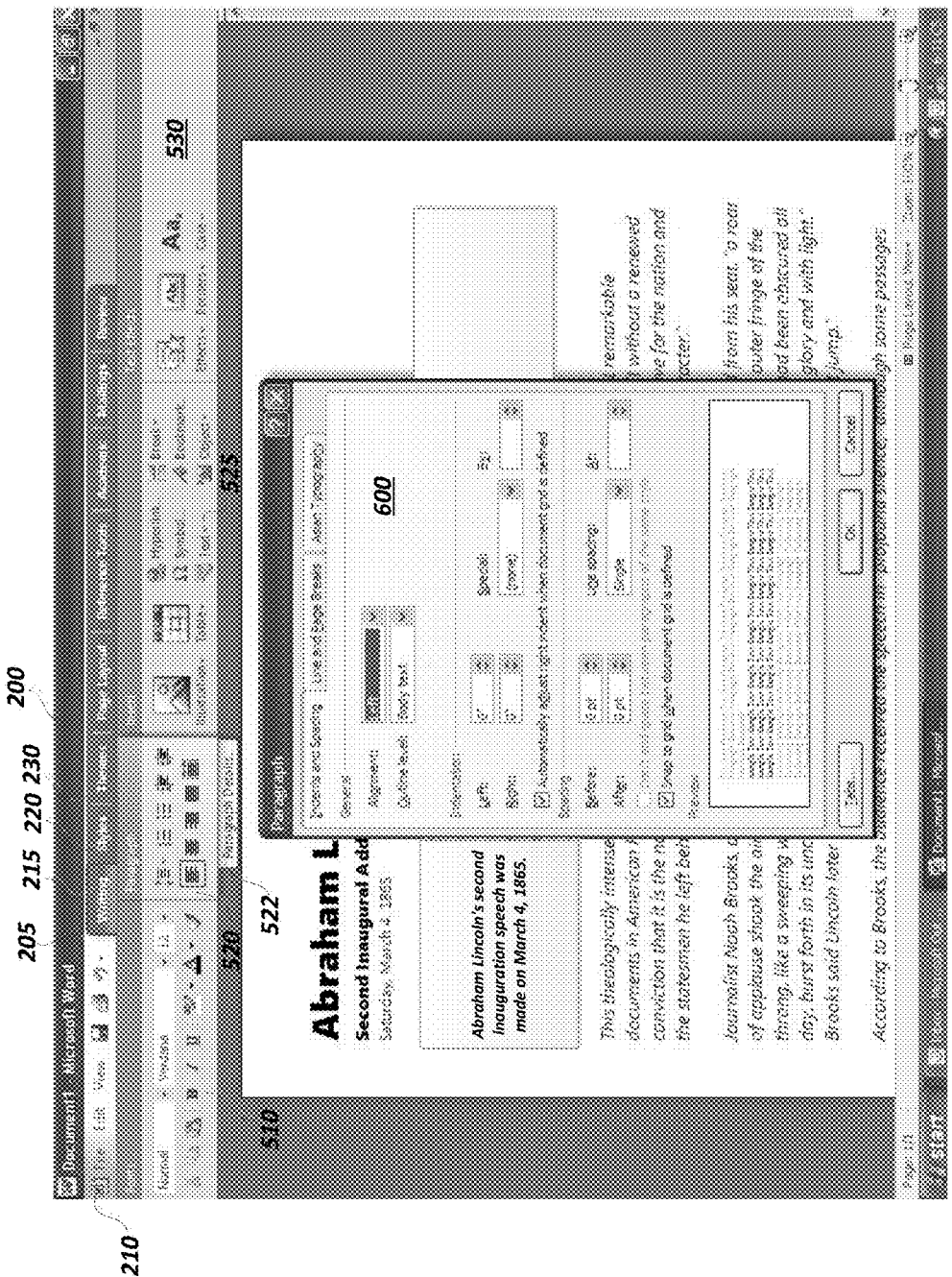
FIG. 6 illustrates a computer screen display showing a pop-up user interface for providing detailed functionality associated with a selected subset of functionalities presented in the ribbon-shaped user interface illustrated in FIGS. 2 through 4.

Referring to FIG. 6, a second launched dialog 600 is illustrated which is associated with a second logical grouping section 520 of the user interface 200. As described with respect to FIG. 5, a tab 522 is deployed underneath the logical grouping section 520 of selectable functionality controls for launching the dialog 600 for providing a user additional functionality or additional information regarding attributes applied to a selected document or object under the associated selectable logical grouping section 520, for example the "Paragraph" section. As should be appreciated, dialog such as the dialogs 540 and 600 illustrated in FIGS. 5 and 6, may be launched for any logical grouping of selectable functionality controls displayed in the user interface 200 where additional functionality or details may be provided to a desiring user.

Figure 7:
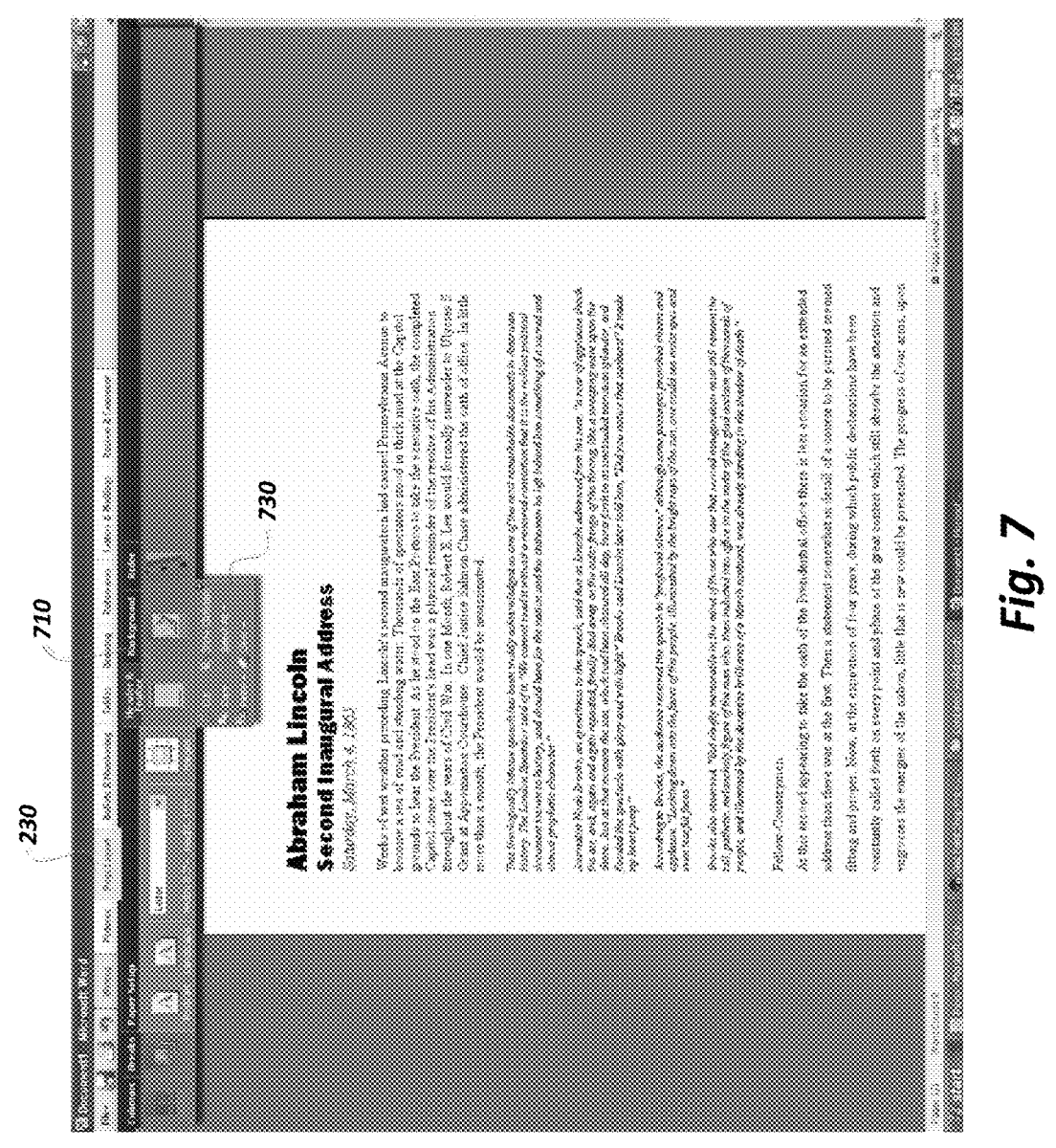

Referring now to FIG. 7, a drop-down menu of selectable functionality controls is illustrated beneath a selected control 710 in the main body of the user interface 200. In some cases, insufficient space may be available for all selectable functionality controls to be displayed into a logical grouping in the user interface 200 upon selection of an associated functionality tab 230. According to embodiments of the invention, in such a case, a control such as the "Header & Footer" control 710 may be populated into the user interface 200. Selection of the control 710 causes deployment of the drop-down menu 730 for displaying selectable functionality controls associated with the control 710.

Figure 8:
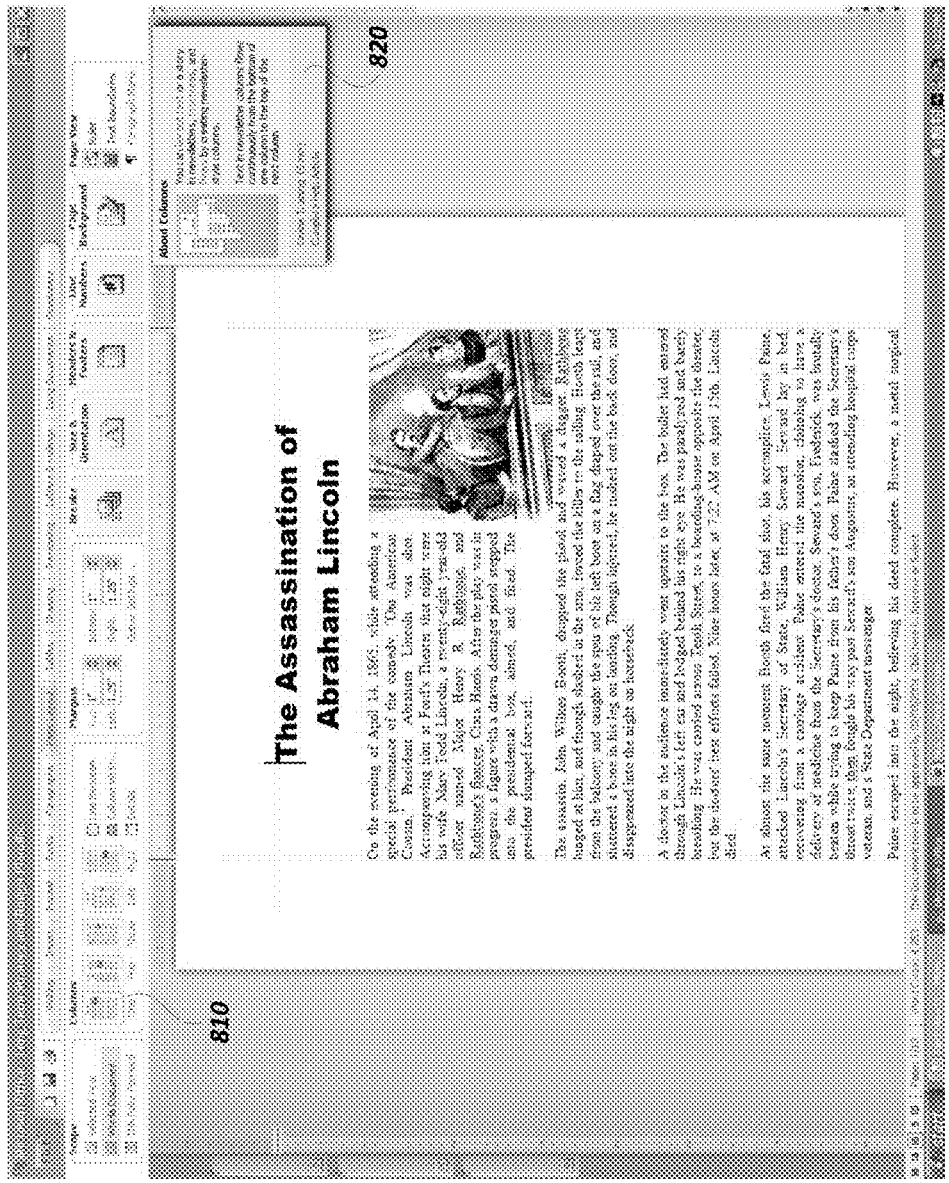
FIG. 8 illustrates a computer screen display showing the presentation of a tool tip dialog box for providing helpful information about a selected or focused-on functionality control.

Referring now to FIG. 8, a variety of tool tips may be displayed to the user to provide helpful information or tutorials regarding different functionality of an associated application. For example, as illustrated in FIG. 8, a tool tips pop-up dialog 820 is displayed for providing helpful information regarding the functionality available under a "Columns" section 810. As shown in the pop-up dialog 820, helpful information is provided regarding application of columns formatting and structure to a document. In addition, online training and other helpful information may be provided through the deployed pop-up dialog. As should be understood, helpful tool tips, such as the tool tip 820, may be provided for any functionality grouping displayed in the user interface 200, or tool tips 820 may be provided for individual functionality controls. Deployment of tool tips 820 may be performed in response to a variety of different user actions. For example, placing a mouse cursor on a selected control or grouping of controls followed by selection of a function key, such as the F1 key may deploy the pop-up dialog. For another example, a right-click of a mouse device on a given grouping of functionality controls may deploy the pop-up dialog. Other mechanisms including mouse-over actions or automatic deployment after a set amount of time of focusing a mouse cursor in a given section of the user interface 200 may be utilized for deploying the tool tips pop-up dialog.

As should be appreciated, depending upon the screen size available for displaying the user interface 200 or depending upon the display settings utilized by a given user of the user interface 200, varying amounts of space will be available for displaying the task-based tabs and associated selectable functionality controls. Accordingly, when sufficient space is available in the user interface 200 for displaying logical groupings associated with a given task-based tab and extra real estate is available, a determination may be made as to displaying additional logical groupings associated with a subsequently selected task-based tab.

As described above, with reference to FIG. 4, space limitations in the sections of the user interface 200 containing logical groupings of selectable functionality controls may be such that some logical groupings of functionality controls may be closed or collapsed from view. Alternatively, there may be times when all logical groupings of functionality controls associated with a given task-based tab or editing context may fit within the available display space and additional empty display space may be available for the display of additional user interface components. For example, if a large resolution computer monitor is in use, or if multiple monitors are in use, display space may be sufficient to display all the logical groupings of functionality controls associated with a given task-based tab and the logical groupings of one or more additional task-based tabs such that a row of adjacently positioned portions of the ribbon-shaped user interface may be populated with logical groupings of functionality controls associated with different task-based tabs.

Figure 9:
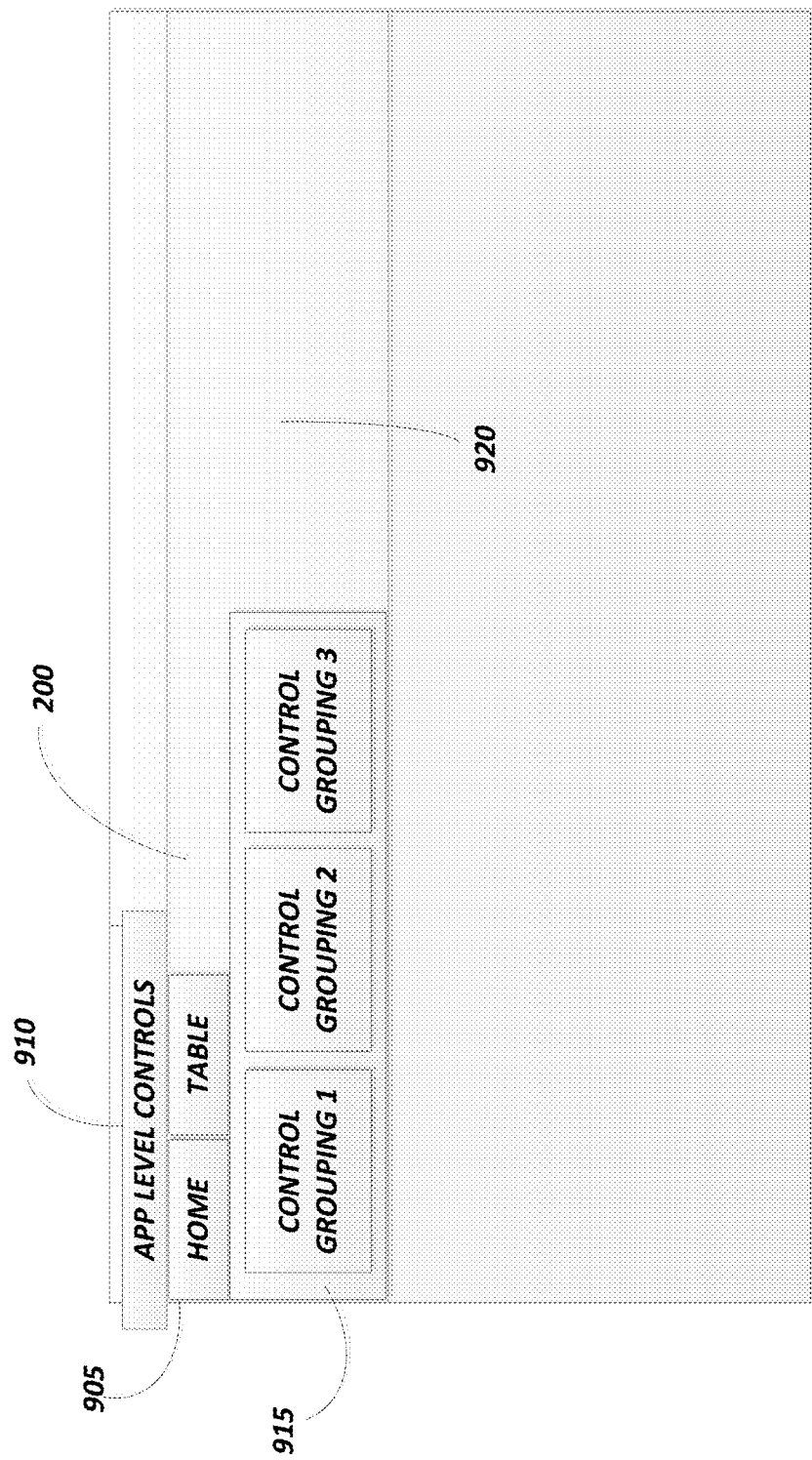
FIG. 9 illustrates a computer screen display showing empty space within a ribbon-shaped user interface displaying a functionality control section of selectable functionalities associated with a selected top-level functionality tab.

FIG. 9 illustrates a computer screen display showing empty space within a ribbon-shaped user interface displaying a functionality control section of selectable functionality controls associated with a selected top-level functionality tab. According to this embodiment, if the user interface contains available display space after the display one or more selectable functionality controls in response to receiving an indication of a selection of a given user interface tab, the available display space may be used to display additional selectable functionality controls associated with an additional user interface tab associated with a different task. Two or more top-level functionality tabs and the functionality control sections containing logical groupings of particular functionality controls associated with the selected top-level functionality tabs may be displayed in the user interface. That is, selection of a first top-level functionality tab may cause the display in a first portion of the user interface a first set of selectable functionality controls associated the selected first top-level functionality tab, and selection of a second or subsequent top-level functionality tab may cause the display in a second or subsequent portion of the user interface a second or subsequent set of selectable functionality controls associated with the selected second or subsequent top-level functionality tab. Alternatively, the second or subsequent portion of the user interface may be populated with a second or subsequent set of selectable functionality controls associated with the context of an edited object. For example, editing a picture object in a text document may cause the display of a set of functionality controls associated with picture editing in an empty space in the user interface adjacent to a presently displayed set of functionality controls associated with a previously selected top-level functionality tab.

Referring to FIG. 9, upon selection of a task-based tab from the tab section, a first set of selectable functionality controls associated with the selected task-based tab is presented in different logical groupings in the user interface 200. For example, upon selection of the "Home" tab 905, a first set of control groupings having functionality buttons for accessing application functions associated with the "Home" feature of the application are presented in the control section 915. A "Table" tab 910 is illustrated which may be selected for replacing the first control section with a second control section for containing functionality controls associated with a "Table" feature of the application, or for populating an empty space in the user interface 200 with a second control section, as described below. As should be appreciated, the task-based tabs and associated functionality control groupings described herein are for purposes of example and are not limiting of the vast number of application functions that may be represented by task-based tabs and associated groupings of functionality buttons and controls.

As illustrated in FIG. 9, in addition to the displayed selectable functionality control section 915, empty space 920 is also contained in the user interface 200. In one embodiment, empty space 920 may be present in the user interface if there are a small number of selectable functionality controls associated with a selected task-based tab. For example, in FIG. 9, the user interface is populated with functionality control sections containing selectable functionality controls associated with the selected task-based tab "Home" 905. As shown, the selectable functionality controls do not take up the full display space available in the user interface 200, and thus, empty space 920 is present. In another embodiment, empty space 920 may be available if the application is displayed on a large resolution monitor. In yet another embodiment, the application may be displayed on multiple monitors, which may allow for empty space 920 to be present in the user interface 200. As should be appreciated, there may be many reasons for empty space 920 to be present in the user interface 200.

As was previously described and illustrated in FIGS. 3 and 4, upon selection of a second task-based tab from the tab section, a different functionality control section of selectable functionality controls in different logical groupings is presented and replaces the previously displayed selectable functionality controls in the user interface 200 associated with the selected task-based tab. To increase efficiency and to take advantage of the available space of large monitors, multi-monitor setups, and/or to allow users to see more commands and multiple sets of tools on the screen at a time, the available user interface display space may be utilized to display two or more resizable functionality control sections. According to embodiments of the present invention, as described below with reference to FIG. 10, a multi-tab mode may be utilized whereupon the activation of a different top-level functionality tab displays a second functionality control section within the user interface. With this functionality, a user may choose to view the functionality controls of multiple task-based tabs side by side.

Figure 10:
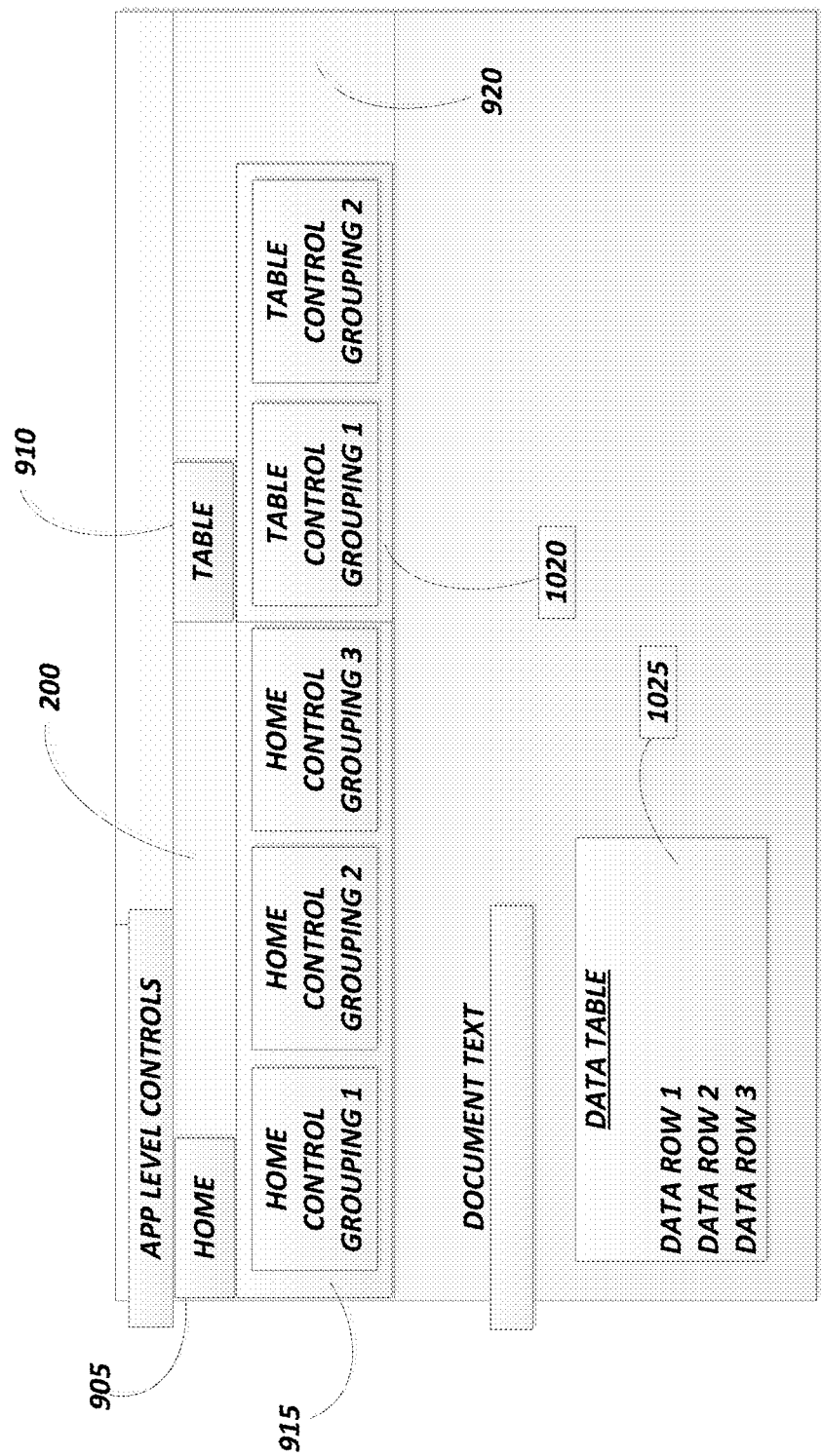
FIG. 10 is an illustration of a computer screen display showing a ribbon-shaped user interface displaying two functionality control sections containing a plurality of functionalities available under two selected top-level functionality tabs.

FIG. 10 illustrates an example display of a second set of selectable functionality controls in the empty space 920, upon selection of a second task-based tab. As illustrated in FIG. 10, the user interface 200 is populated with selectable functionalities associated with the "Home" tab 905. When a second top-level functionality tab, "Table" 910," is activated, functionality control groupings associated with the "Table" tab 910 are displayed in the "Table" functionality control section 1020 in the user interface 200 adjacent to the functionality control section 915 containing functionalities associated with the "Home" tab 905. Thus, the empty space 920 is replaced with the functionality controls of the second selected tab, and the user is able to use functionalities associated with two different top-level functionalities without having to toggle between the two tabs.

As should be appreciated, a user may explicitly select and arrange tabs into an arrangement he/she wants by selecting additional tabs until all available empty space 920 is consumed. Once two or more portions of the ribbon-shaped user interface are populated with logical groupings of functionality controls for two or more associated selected tabs, the user may move the portions relative to each other. For example, referring to FIG. 10, a user may desire to move the "Table" tab and associated functionality controls to the left side of the user interface 200 so that the "Home" tab and associated controls are then positioned on the right side. Such manipulation of the portions or sections of the ribbon-shaped user interface may be performed through a number of means for example drag and drop or keyboard or voice command. According to one embodiment, placement of portions of functionality controls by a user may be made permanent so that each time a user launches an instance of the associated application and activates two or more task-based tabs, the associated portions of the user interface containing functionality controls for each of the task-based tabs will be positioned according to the previous arrangement set by the user. As should be appreciated, such positioning arrangements may be changed as often as desired by the user. This functionality enables users to efficiently access the tools he/she needs without having to actively manage the location of his/her tabs.

A number of methods may be used to enable a multi-tab display. According to one embodiment, the user interface 200 may be manually populated with functionality control sections by selecting one or more task-based tabs, as described above. For example, a user may decide he may only need to utilize functions associated with the "Home" tab and the "Table" tab to draft the document he/she is working on that will contain text and table objects. In addition to displaying additional groupings of functionality controls by selection of task-based tabs 905, 910, empty space 920 may be populated with functionality controls associated with an application task or function automatically based on user editing actions. For example, editing a picture object in a text document may cause the display of a set of functionality controls associated with picture editing in the empty space 920 adjacent to a presently displayed set of functionality controls associated with a previously selected top-level functionality tab. For purposes of example, referring to FIG. 10, a user may be typing text into a document utilizing a word processing application, and selectable functionalities associated with the "Home" tab 905 may be displayed within the "Home" functionality control section 915 of the user interface 200. The functionality controls contained in the "Home" section 915 may provide the user those functions needed to edit the text portions of the document. In addition to the text in the document, a table 1025 may be embedded in the document. According to an embodiment, if the user begins editing the table 1025 by clicking on the table, mousing over the table or other means for selecting the table, functionality controls associated with editing the table may be automatically populated into the empty space 920 so that the user does not have to manually select a task-based tab associated with table editing in order to have the desired functionality controls displayed. That is, rather than requiring the user to select the "Table" tab 910, editing the table object 1025 may cause the "Table" tab 910 and the functionality control section 1020 associated with the "Table" tab to be automatically populated in the empty space 920, as illustrated in FIG. 10.

According to another embodiment, the user interface 200 may be populated automatically with relevant task-based tabs associated with document content and/or context without user editing action. For example, referring again to FIG. 10, the mere existence of the table object 1025 in the displayed portion of the document may cause the automatic display of the associated functionality controls in the empty space 920 without user selection of the table object. As the document is scrolled up or down, and as new objects are brought into display, functionality controls for those objects may be displayed in a portion of the user interface under an appropriate task-based tab. For example, if the document illustrated in FIG. 10 is scrolled to a different page that contains text, a table and a picture, functionality controls for both the table object and the picture object may be automatically populated in the user interface if sufficient empty space 920 is available. When the document is scrolled to a page containing only text, the functionality controls for the table and picture objects may be automatically dismissed from display.

If a third-party plug-in application (that is properly registered with an application utilizing the tab interface described herein) is being utilized, and if an object that has been created using the third-party plug-in application is selected, then selectable functionalities associated with the editing of that object may be displayed within a functionality control section within the user interface. For example, a user may import a table he/she created using a third party accounting software application into an edited document. Upon selection of that table, selectable functionalities from the third-party plug-in application associated with the data within the table may be displayed within the user interface as a logical grouping of functionality controls for utilizing functions of the third-party application.

The layouts of each section of logical groupings of functionality controls under respective task-based tabs may be rearranged according to the available space. As should be appreciated and as described previously, the size of the display of individual logical groupings may be reduced to allow space for the display of all associated logical groupings. At display time, a determination may be made as to the available space. Accordingly, the display size may be reduced, text labels may be shortened or eliminated, and the layout of individual controls contained in given groupings may be rearranged to allow for more efficient use of space. On large resolution monitors, multiple tabs may be able to appear side by side at their largest sizes allowing users to optimize the use of their screen in a way that they previously could not. In addition, a user may manually change the size of one or more displayed groupings of controls. For example, referring to FIG. 10, a resizing control may be displayed at the right edge of each displayed control section 915, 1020 for allowing a click and drag operation for resizing each control section as desired. As should be appreciated, a click and drag operation is only one example of the many ways a control section may be resized, as described above. As the size of a given control section is reduced or enlarged, the display of controls and associated content, for example, text labels, may be automatically altered according to the change in space. Alternatively, if user action or based on document context a new functionality control section is added to the empty space 920, as described above, the displayed control sections may be automatically resized to optimize the display of functionality controls based on available display space.

Figure 11:
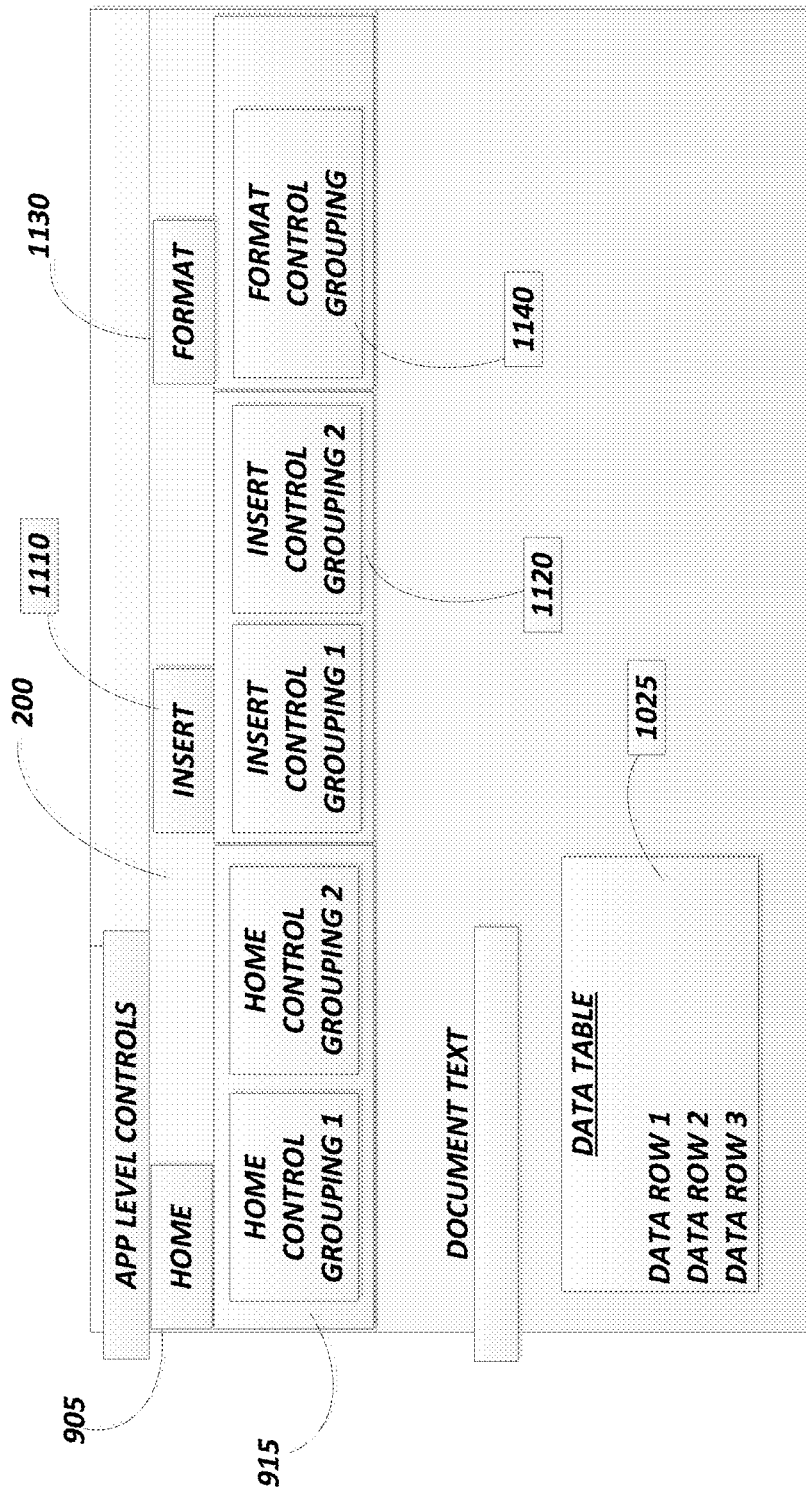
FIG. 11 is an illustration of a computer screen display showing a ribbon-shaped user interface displaying three functionality control sections containing a plurality of functionalities available under three selected top-level functionality tabs.

FIG. 11 is an illustration of a computer screen display showing a ribbon-shaped user interface displaying three functionality control sections containing a plurality of functionalities available under three selected top-level functionality tabs. As illustrated in FIG. 11, an example user interface 200 is populated with selectable functionality controls associated with three task-based tabs, "Home" 905, "Insert" 1110 and "Format" 1130. As described above, the three control sections 915, 1120, and 1140 may be deployed manually whereby a user selected associated task-based tabs, or the control sections may be deployed automatically if the context of the document, for example, user selection of an object in the document, warrants the automatic display of a control section of functionality controls associated with the object. In addition, FIG. 11 illustrates both manual and automatic resizing of functionality control sections where the first control section 915 is illustrated in a reduced display configuration relative to the example display of that section in FIG. 10. As described above, that section may have been reduced manually by dragging the right edge of the section or automatically based on available space in the user interface 200 for displaying each of the desired control sections.

As described herein, an improved user interface is provided for exposing task-based top-level functionality tabs for displaying logical groupings of selectable software functionality controls associated with given task-based functionality tabs. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing a user interface at a display device, the method comprising:
   generating a row of top-level functionality tabs, each top-level functionality tab within the row of top-level functionality tabs being associated with a different functionality;
   generating, adjacent to the row of top-level functionality tabs, a selectable functionality control section to display a plurality of selectable controls based on a selected top-level functionality tab, wherein selectable functionality control section persists during editing of an electronic document;
   receiving a first selection of a first top-level functionality tab from the row of top-level functionality tabs;
   based on the first selection, generating in the selectable functionality control section, a first set of selectable controls relating to the functionality of the first top-level functionality tab;
   receiving a second selection of a second top-level functionality tab from the row of top-level functionality tabs; and
   based on the second selection, generating in the selectable functionality control section, a second set of selectable controls relating to the functionality of the second top-level functionality tab, wherein the second set of selectable controls are configured to be displayed concurrently with the first set of selectable controls in the selectable functionality control section.

2. The method of claim 1, further comprising:
   receiving a third selection of a third top-level functionality tab from the row of top-level functionality tabs; and
   based on the third selection, generating in the selectable functionality control section, a third set of selectable controls relating to the functionality of the third top-level functionality tab, wherein the third set of selectable controls are configured to be displayed concurrently with the first set of selectable controls and the second set of selectable controls in the selectable functionality control section.

3. The method of claim 1, further comprising generating a pop-up dialog upon receiving a mouse-over on any selectable control of the following: the first set of selectable controls and the second set of selectable controls.

4. The method of claim 1, displaying an additional selectable control within the selectable functionality control section, wherein selection of the additional selectable control displays additional functionality associated with the selected top-level functionality tab.

5. The method of claim 1, further comprising:
   receiving a selection to collapse the selectable functionality control section; and
   collapsing the selectable functionality control section upon receiving the selection to collapse.

6. The method of claim 1, further comprising receiving an input to alter an order to top-level functionality tabs in the row of row of top-level functionality tabs.

7. The method of claim 6, wherein the input is a drag-and-drop type input.

8. The method of claim 6, further comprising organizing one or more controls in the first set of selectable controls into one or more logical groupings.

9. A method for providing a user interface at a display device, the method comprising:

generating a row of top-level functionality tabs, each top-level functionality tab within the row of top-level functionality tabs being associated with a different functionality;

generating, adjacent to the row of top-level functionality tabs, a selectable functionality control section to display a plurality of selectable controls based on a selected top-level functionality tab, wherein selectable functionality control section persists during editing of an electronic document;

receiving a first selection of a first top-level functionality tab from the row of top-level functionality tabs;

based on the first selection, generating in the selectable functionality control section, a first set of selectable controls relating to the functionality of the first top-level functionality tab;

receiving a second selection of an object within an electronic text document; and based on the second selection, generating in the selectable functionality control section, a second set of selectable controls relating to the editing the selected object, wherein the second set of selectable controls are configured to be displayed concurrently with the first set of selectable controls in the selectable functionality control section.

10. The method of claim 9, further comprising generating a pop-up dialog upon receiving a mouse-over on any selectable control of the first set of selectable controls.

11. The method of claim 9, further comprising, upon receiving a selection of one of the first set of selectable controls, applying functionality associated with the selected one of the selectable controls.

12. The method of claim 9, displaying an additional selectable control within the second section, wherein selection of the additional selectable control displays additional functionality associated with the selected top-level functionality tab.

13. The method of claim 9, further comprising:

receiving a selection to collapse the selectable functionality control section; and collapsing the selectable functionality control section upon receiving the selection to collapse.

14. The method of claim 9, wherein the object is a table object and the second set of selectable controls related to editing the table object.

15. A system providing a user interface at a display device, the system comprising:

at least one processor; and a memory storing instructions that when executed by the at least one processor perform a set of operations including:

identifying at least one object within an electronic document;

based on the at least one identified object, generating a row of top-level functionality tabs, wherein at least one top-level functionality tab within the row of top-level functionality tabs is associated with functionality for editing the at least one identified object;

generating, adjacent to the row of top-level functionality tabs, a selectable functionality control section to display a plurality of selectable controls based on a selected top-level functionality tab, wherein selectable functionality control section persists during editing of an electronic document;

receiving a selection of a top-level functionality tab from the row of top-level functionality tabs;

based on the selection, generating in the selectable functionality control section, a first set of selectable controls relating to the functionality of the first top-level functionality tab;

receiving a second selection of a second top-level functionality tab from the row of top-level functionality tabs; and based on the second selection, generating in the selectable functionality control section, a second set of selectable controls relating to the functionality of the second top-level functionality tab.

16. The system of claim 15, wherein the second set of selectable controls are displayed concurrently with the first set of selectable controls.

17. The system of claim 15, wherein the second set of selectable controls replace the first set of selectable controls.

18. The system of claim 15, wherein the operations further comprise:

receiving a selection to collapse the selectable functionality control section; and collapsing the selectable functionality control section upon receiving the selection to collapse.

19. The system of claim 15, wherein the operations further comprise organizing one or more controls in the first set of selectable controls into one or more logical groupings.

20. The system of claim 15, wherein the second top-level functionality tab is the top-level functionality tab is the at least one top-level functionality tab associated with functionality for editing the at least one identified object.

* * * * *